(12) United States Patent
Sefcik

(10) Patent No.: US 8,160,382 B2
(45) Date of Patent: Apr. 17, 2012

(54) METHOD OF OBJECT RECOGNITION IN IMAGE DATA USING COMBINED EDGE MAGNITUDE AND EDGE DIRECTION ANALYSIS TECHNIQUES

(75) Inventor: Jason A. Sefcik, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1219 days.

(21) Appl. No.: 11/907,596

(22) Filed: Oct. 15, 2007

(65) Prior Publication Data

US 2009/0226033 A1 Sep. 10, 2009

(51) Int. Cl.
*G06K 9/00* (2006.01)
*G06K 9/40* (2006.01)
*G06K 9/60* (2006.01)

(52) U.S. Cl. .................. 382/266; 382/308; 382/103

(58) Field of Classification Search .............. 382/103, 382/104, 118, 141, 157, 190, 199, 224, 225, 382/226, 284, 291; 250/330, 334, 342; 345/7, 345/449; 348/149, 458
See application file for complete search history.

(56) References Cited

U.S. PATENT DOCUMENTS

| | | | | |
|---|---|---|---|---|
| 4,603,430 A * | 7/1986 | Sacks | ........................... | 382/206 |
| 4,685,143 A * | 8/1987 | Choate | ........................... | 382/170 |
| 6,445,832 B1 * | 9/2002 | Lee et al. | ........................... | 382/266 |
| 6,819,779 B1 | 11/2004 | Nichani | | |
| 6,961,466 B2 * | 11/2005 | Imagawa et al. | ........................... | 382/190 |
| 7,116,823 B2 * | 10/2006 | Clark et al. | ........................... | 382/199 |
| 7,146,057 B2 * | 12/2006 | Clark et al. | ........................... | 382/242 |
| 7,657,059 B2 * | 2/2010 | Olson et al. | ........................... | 382/103 |
| 7,817,859 B2 * | 10/2010 | Lee | ........................... | 382/199 |

FOREIGN PATENT DOCUMENTS

WO    WO 2007/011450 A1    1/2007

OTHER PUBLICATIONS

Neto, Automatic target detection and tracking in forward-looking infrared image sequences using morphological connected operators, Journal of Electronic Imaging 13(4), 802-813 (Oct. 2004).*
Bhanu, B.; Holben, R.D.; , "Model-based segmentation of FLIR images," Aerospace and Electronic Systems, IEEE Transactions on , vol. 26, No. 1, pp. 2-11, Jan. 1990.*
Sefcik et al., "Screening Closing Scenarios for Tactical Targets," Proceedings of the International Society for Optical Engineering (SPIE), vol. 4714, Jan. 1, 2002, pp. 223-230, XP002485477.

* cited by examiner

*Primary Examiner* — Andrae S Allison
(74) *Attorney, Agent, or Firm* — Birch Stewart Kolasch & Birch, LLP

(57) ABSTRACT

Methods for detecting areas of interest in an image using combined edge magnitude and edge direction analysis techniques are presented. One embodiment features using thermal imaging data to detect hotspots in maritime settings that may be potential targets for tracking or weapons systems. The edge magnitude and edge direction data are derived from the intensity image and then combined with the intensity image and analyzed morphologically to remove noise and background elements. The combined image data is then selectively filtered to remove horizontal non-target elements and then analyzed further against target size information to determine which detected and analyzed hotspots are valid targets. Another embodiment features receiving as input an intensity image along with its associated edge magnitude and edge direction images, which have both been created by a means outside the detection method. Yet another embodiment features a detection method that does not selectively filter out horizontal image elements.

25 Claims, 16 Drawing Sheets

METHOD OF OBJECT RECOGNITION IN IMAGE DATA USING COMBINED EDGE MAGNITUDE AND EDGE DIRECTION ANALYSIS TECHNIQUES

TECHNICAL FIELD OF THE INVENTION

The present invention relates in general to the analysis of multi-dimensional images, and more particularly, to a system and method for extracting the shape and size of an object or area of interest from the background.

BACKGROUND OF THE INVENTION

Object recognition involves the analysis of a two-dimensional image in order to identify specific objects or areas of interest. Many systems incorporate a three-step process where a pre-screener identifies regions of interest or candidate objects which are then analyzed by an intermediate discriminator that evaluates each area in more detail. The remaining areas are then further analyzed to positively identify them and establish their location in the image.

Two dimensional imaging systems such as video or Forward-looking Infrared (FLIR) systems analyze incoming information on a nearly continuous basis and must identify and locate any areas of interest identified by the camera or sensor. One method for image analysis is known as blob analysis. This method of analysis, the basics of which are known to those skilled in the art, allows for fast operation and is reasonably accurate under ideal conditions. It uses a method called connectivity analysis to group pixels into a blob if they are adjacent to one another. For each identified blob, properties such as area, perimeter, and position can then be determined. One main limitation is that its speed and efficiency can be severely degraded if extra features are present in the image. These extra features require additional processing and computing resources, degrading performance.

This blob-finding method is used in FLIR systems to find warm objects of the approximate size and shape of the expected target. This was suitable for older FLIR systems, which were not able to detect direct radiation from the sun until it turned into heat. Newer, smaller FLIR systems take in shorter wavelengths and may often become blinded by reflected sunlight. This is a result of the need for smaller sensors and therefore smaller apertures that had to take in a broader spectrum to achieve the same resolution. Unlike the larger-aperture FLIR systems, which showed anything that did not directly radiate heat as black, the small-aperture systems tend to capture solar radiation reflected from nearly every feature in their field of view. This greatly increases the number of potential false alarms detected because the sensor detects everything in its field of view that is reflecting infrared solar energy. Since there is no reliable method for determining immediately upon detection whether a pixel is a background pixel or an object pixel, the sensor must analyze all the incoming pixels and determine if they are part of a potential target.

Because of the increased processing requirements that such systems are confronted with in the face of so many areas requiring further evaluation, the efficiency of these systems may be reduced significantly. In some worst-case scenarios, the system may be rendered effectively inoperable due to its inability to keep up with the flow of incoming data.

SUMMARY OF THE INVENTION

The present invention provides a system and method for identifying areas of interest in an image that includes using a combination of edge magnitude and edge direction analysis. More specifically, the image is analyzed for areas that not only contrast with the surrounding background but also meet a combination of built-in and user-defined intensity and shape criteria.

In current blob-finding detection algorithms, there is a balance between the accuracy of detection and the prevalence of 'false alarms'—incorrectly detected objects or areas. As sensitivity is increased and detection parameters are more broadly construed, the level of detections increases, but there is a corresponding increase in the rate of false alarms. The present invention enables an increase in detection accuracy through improved sensitivity without the accompanying increase in false alarm detections by, for example, analyzing both the shape of a detected blob and the magnitude of its detection footprint.

Unlike other detection methods that work with only a single input image, the inventive method utilizes the original intensity image, an edge magnitude image, and an edge direction image. Analyzing these images in combination allows for the detection of both high-contrast and low-contrast elements in the image without a significant increase in "false alarm" detections. This is possible because even at increased sensitivity levels, the algorithm still validates the shape of the detected blob and discards it if it does not meet detection parameters for shape and size.

Unlike other detection methods that rely on subject intensity being greater than the surrounding background, the inventive method is focused on differences in intensity between the subject or subjects and the surrounding background. This allows the inventive method to function with any input imagery where the objects or areas requiring detection have different image intensity than their surrounding background. Any imagery input, including mid-wave and long wave infrared, video, and millimeter-wave can be analyzed using the inventive method. The user-defined detection parameters can be tailored to accommodate any type of object or area detection paradigm using any available form of imagery.

Also unlike other detection methods, the processing load is maintained at a moderate level as sensitivity and positive detection rates increase. While a sufficiently complex detection method may be capable of eventually correctly identifying every area of interest in an image, the inventive method facilitates real-time operation by enabling a computationally efficient approach to quickly and correctly detect objects and areas of interest in an image.

In a preferred embodiment of the inventive method, one of the goals is the extraction of target-like hotspots from a mid-wave infrared image while minimizing the extraction of hotspots that are false alarms. The target size parameters supplied as input data allow the inventive method to be tailored for specific environments such as maritime or open ground. It can be used to identify both known and unknown targets and target areas. This embodiment is intended as a target acquisition system for missile systems and other weapons systems.

In alternative embodiments, the goal may be the identification of large, dense objects in baggage passing through an x-ray scanner, the detection and tracking of vehicles using video monitoring, or identification of areas of interest on a PET scan. The inventive method can effectively be applied to any scenario where automated forms of object or area detection, tracking, or identification are required.

In a preferred embodiment of the inventive method, the infrared intensity image is used to create a thresholded magnitude and a thresholded direction image. These images are then used to eliminate from further analysis any areas of pixels that are not part of the thresholded images. This greatly reduces the volume of information that needs to be processed in subsequent detection steps.

The combination of edge and magnitude detection schemes also eliminates the need for computationally expensive steps such as edge tracing or template matching. The direction image is used to ensure that the target area is not simply a horizon line or reflected solar glare by checking to see if it is radiating energy in a relatively oval-shaped pattern. The magnitude image is used to mask the intensity image and allow the subsequent detection steps to focus only on areas of sufficient contrast in the image.

After discarding any hotspots that are too linear in their intensity or direction gradients, an embodiment of the inventive method proceeds to remove any distortion or noise introduced into detected hotspots by the presence of horizon lines or similar horizontal background effects. The removal of horizon lines may be substituted, in other embodiments, for the removal of trees or other natural features that may create false positive hotspots or distort or obscure otherwise valid targets. This adjustment, while not as important to long wave infrared, is essential to increasing the effectiveness of midwave infrared, millimeter wave, and video detectors because unlike long wave infrared detectors, the other sensors detect direct and reflected solar radiation.

In an embodiment of the inventive method, once the list of hotspots has been pared down by quickly confirming the general shape of the hotspot and removing background distortions, the remaining hotspots are evaluated based on their overall size and intensity. The hotspots may also be evaluated against known target information if it is available. The output of this embodiment of the inventive method is a list of targets which can then be passed to a weapons or tracking system for further action.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

SUMMARY OF DRAWINGS

The present invention will become more fully understood from the detailed description given hereinbelow and the accompanying drawings which are given by way of illustration only, and thus are not limitative of the present invention, and wherein.

The drawings will be described in detail in the course of the detailed description of the invention.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The inventive method described herein pertains to the automated detection of objects or areas of interest in an image. The image may be a still image or part of an incoming stream of data, and may be generated from any number of imaging systems, including infrared, video, x-ray, magnetic resonance, millimeter-wave or combinations or fusions thereof.

Figure 1:
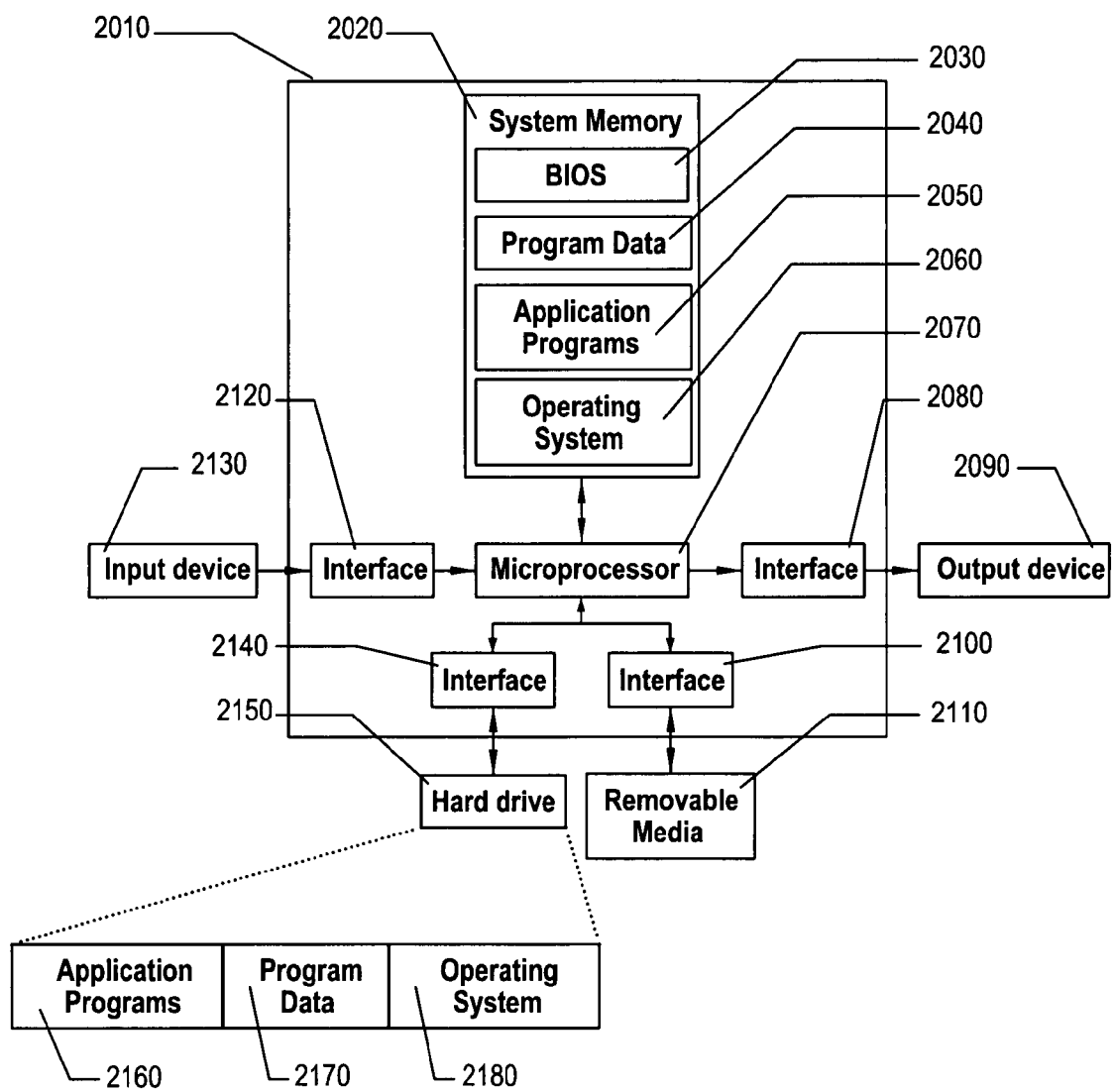
FIG. 1 illustrates a computing environment where a program developed in accordance with aspects of the invention might be stored and run.

FIG. 1 shows a diagram of a computer system that is adapted and programmed according to the invention. An embodiment of the inventive method that has been created as a software program may reside in the application programs 2170 area of the hard drive 2150 or in the application programs 2050 section of the system memory 2020 depending on whether the program was in use. The detection parameters supplied to this embodiment of the inventive method may reside either in the program data 2170 section of the hard drive 2150 or the program data 2040 section of the system memory 2050. Alternatively, the programmatic embodiment of the inventive method or the detection parameters may be stored on removable media 2110 such as a tape, magnetic disk, optical disk, or other removable storage media. Detection parameters may also be provided to the programmatic embodiment via an input device 2130 such as a keyboard, mouse, touch-screen, microphone, radio receiver, or MODEM.

An input device 2130 such as a sensor array, camera, radio receiver, or MODEM is also a preferred method of supplying input image data for the inventive method to operate on. This input image data may also be stored in the program data 2170 section of the hard drive 2150 or supplied on a removable media 2110 format.

The output of the programmatic embodiment of the inventive method may be delivered to the program data 2170 section of the hard drive 2150 or the program data 2040 section of the system memory 2020 for further processing, or may be stored on a removable media 2110 format. The output may also be displayed, printed, transmitted, or otherwise produced through an output device 2090 such as a monitor, a printer, a radio transmitter, a speaker, or a modem.

Such a programmed embodiment is a preferred embodiment of the inventive method, but the functional areas and functional steps described in the inventive method could also be accomplished through a variety of specialized circuits and circuit assemblies such as ASICs, FPGAs, or CPLDs.

Figure 3:
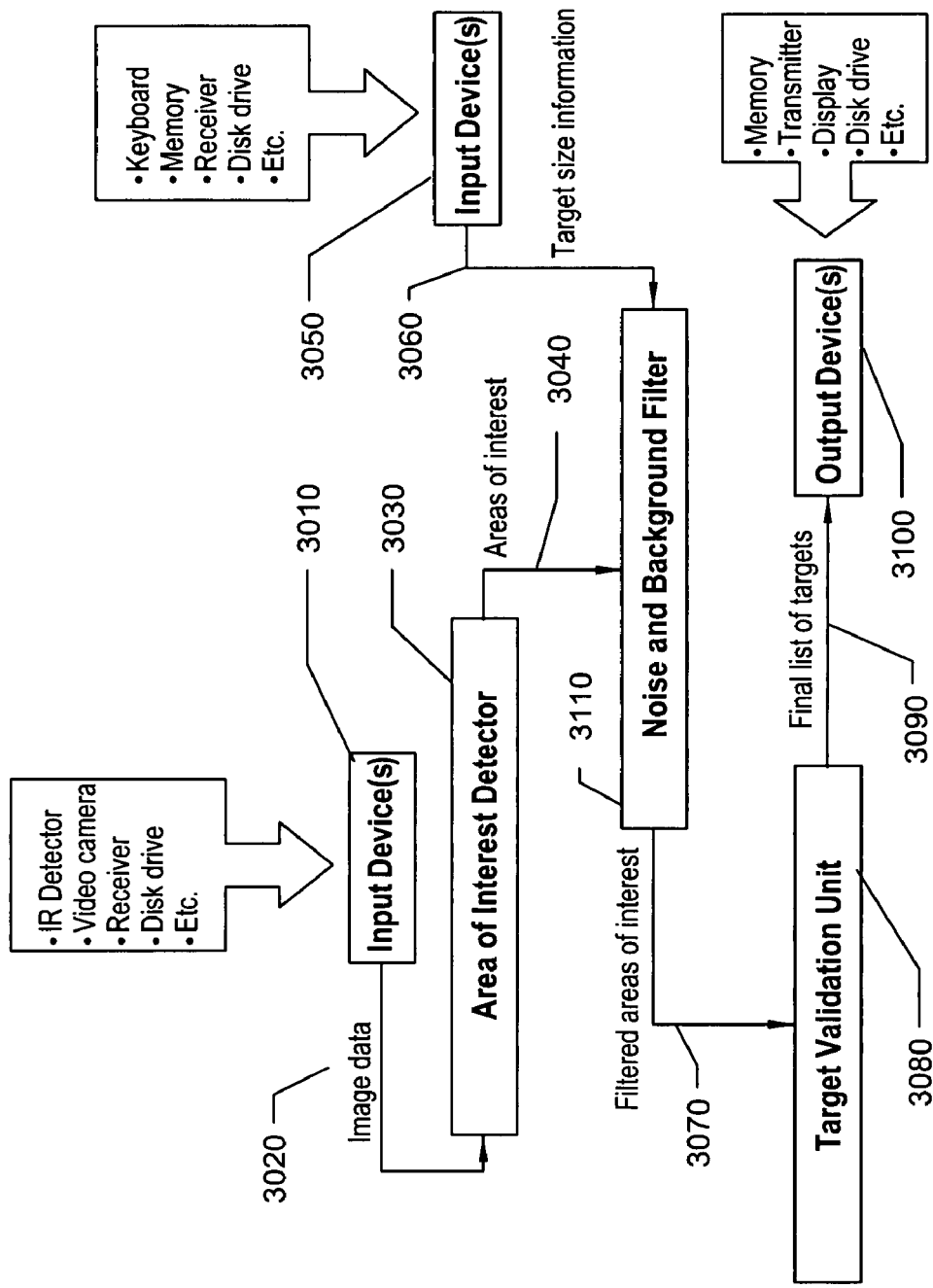
FIG. 3 illustrates another potential embodiment of the inventive apparatus in block diagram format.

FIG. 3 shows a block diagram of the functional units comprising an embodiment of the inventive apparatus intended to detect potential targets for weapons and tracking systems. Image data 3020 is received from an input device 3010 and sent to the Area of Interest Detector 3030, which identifies all potential areas of interest and marks them for further analysis by an embodiment of the Detection phase 1-20 of the inventive method.

An embodiment of the apparatus next passes the detected areas of interest 3040, along with the image data 3020, to the Noise and Background Filter 3110 for a first pass at pruning the list of detected areas to eliminate incorrectly detected areas and distortions or noise in otherwise properly detected areas. This is done according to an embodiment of the Filtering phase 1-30 of the inventive method. Also at this stage, target size information 3060 is introduced into the filter through an input device 3050. This data is used to help determine the specific nature of the distortions and noise that may be present in the image. In alternative embodiments of the invention, target size information and other detection parameters may be introduced at any time in the detection process. These detection parameters may be pre-defined in memory in used on an as-needed basis.

An embodiment of the apparatus next passes the filtered areas of interest 3070, along with the target size information 3060, to the Target Validation Unit 3080 for a second pass at eliminating incorrectly detected areas and evaluating detected areas against specific target size and target number data. This is done through an embodiment of the Validation phase 1-40 of the inventive method. The resultant output from an embodiment of this portion of the apparatus is a final list of targets 3090, which is passed to the output device 3100 for transmission, display, storage, or further analysis.

Figure 4:
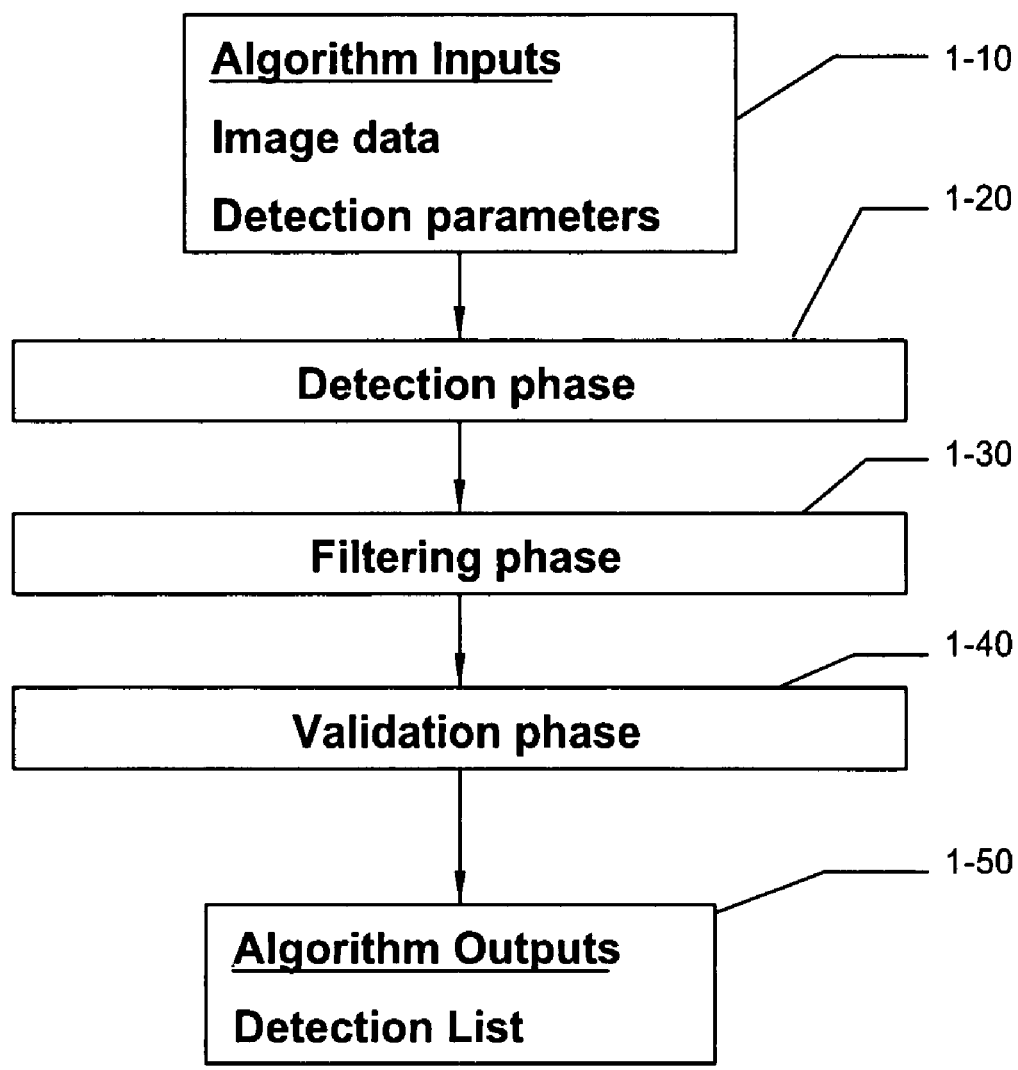
FIG. 4 illustrates a high-level flowchart according to the invention.

FIG. 4 illustrates a high-level view of an embodiment of the inventive method. Embodiments of the inventive method may follow this basic functional flow, starting with the intake of algorithm inputs 1-10. The inputs 1-10 shown here are image data and detection parameters. The image data may be received directly from a detector or set of detectors connected to an embodiment of the inventive apparatus programmed or otherwise constructed to perform the inventive method, or may be supplied in any number of other methods including any available form of signal transmission, loading from storage media such as optical discs, magnetic disks, magnetic tape, flash memory, or any other storage medium, or any other means of information conveyance suitable for storing or transmitting image data.

The detection parameters may be programmed into an embodiment of the inventive method or may be supplied from an internal or external source at the time an embodiment of the inventive method is carried out. The detection parameters may be determined by an embodiment of the inventive method based on the type of image data it receives or may be supplied by a user of an embodiment of the inventive method either through manual input of specific parameters, stored parameter sets, or selection of a set of pre-defined detection parameters already stored in an embodiment of the inventive method. Input of detection parameters not already in an embodiment of the inventive method may be accomplished through any available means of data input including a keyboard, a touch screen, the use of a data transmission system such as RF or a modem, or the use of data on a storage medium such as an optical disc, a magnetic disk, flash memory, magnetic tape, printed documents, or other data storage media.

These algorithm inputs 1-10 are then passed through the Detection phase 1-20, which works to detect potential areas of interest. Once the Detection phase 1-20 has been carried out, the next step of the inventive method is the Filtering phase 1-30, which is used to filter out incorrectly detected areas of interest. Having removed incorrectly detected areas, the Validation phase 1-40 is next used to determine if detected areas are valid. An embodiment of the Validation phase 1-40 compares the filtered detection results against the detection parameters supplied as Algorithm inputs 1-10. The areas of interest that pass the Validation phase 1-40 are passed on as Algorithm outputs 1-50. The Algorithm output 1-50 shown here is a detection list, but output may take multiple forms depending on the embodiment of the inventive method. Examples of alternate forms out output include an image with certain areas highlighted or an array of detected areas sorted by a characteristic such as size or intensity.

Figure 2:
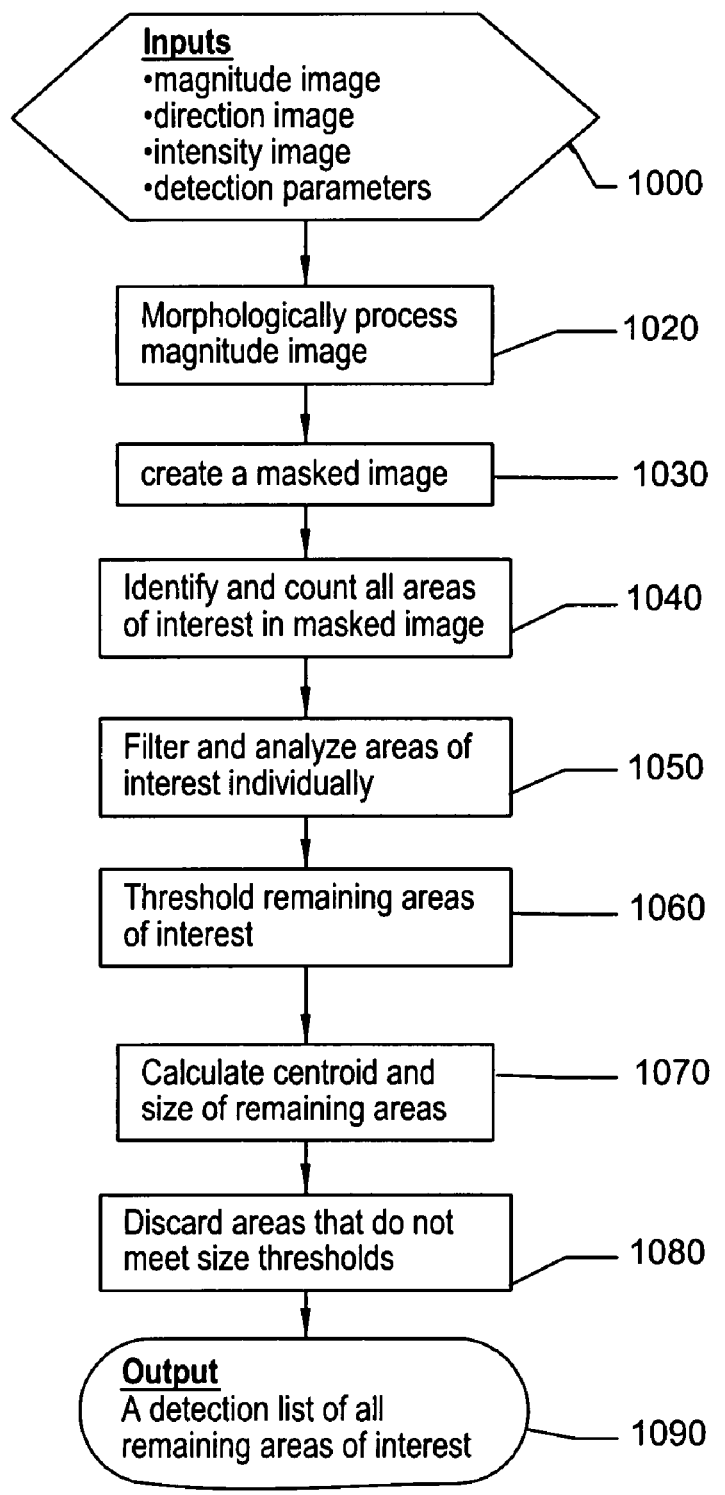
FIG. 2 illustrates a method for detecting areas of interest in an image in accordance with aspects of the invention.
Figure 5:
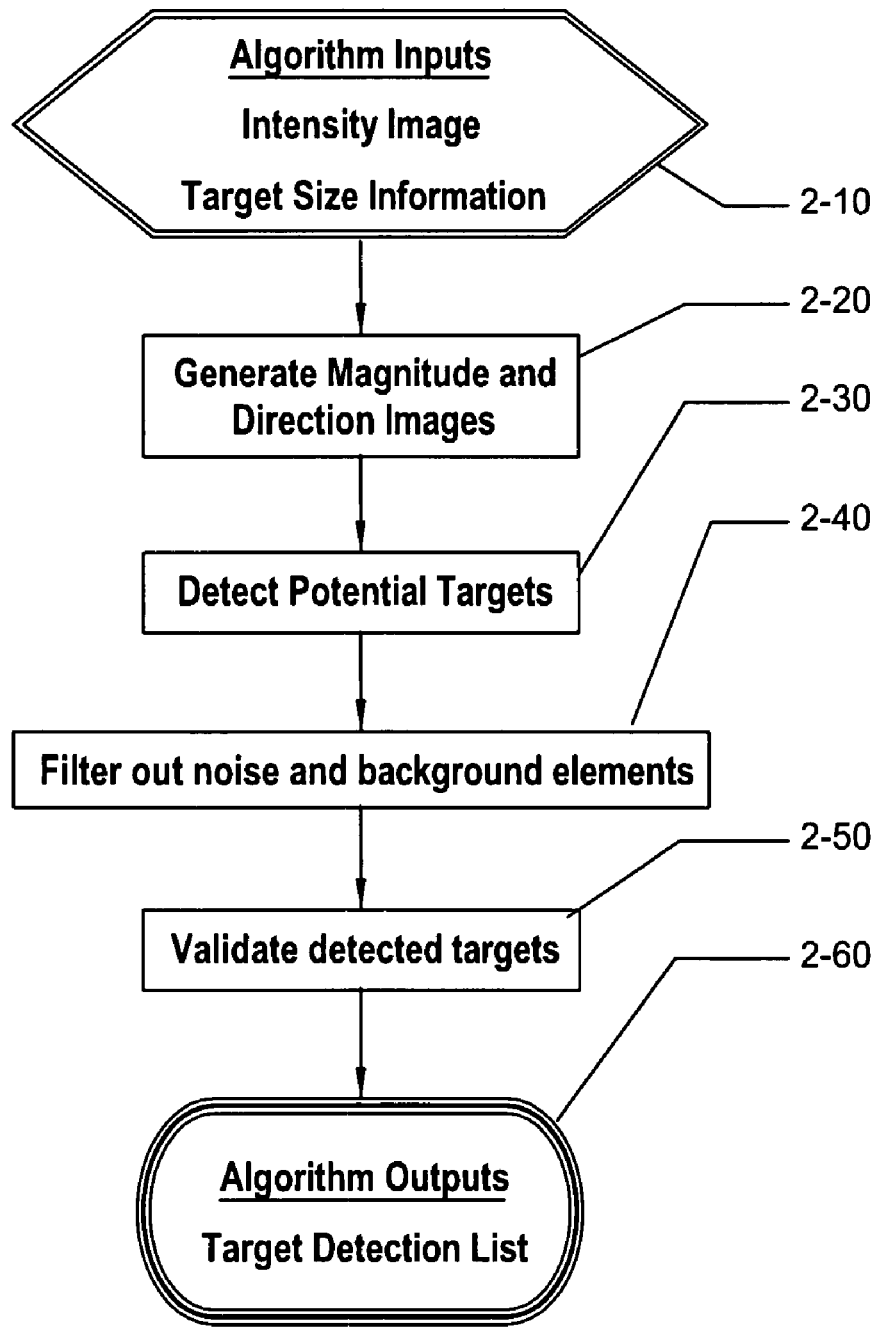
FIG. 5 illustrates a high-level flowchart of an embodiment of the inventive method that is meant to detect targets from real-time imagery data.

FIG. 5 illustrates a high-level view of an embodiment of the inventive method that is intended for the purpose of target detection. In this embodiment, there is a process to generate magnitude and direction images 2-20 included before an embodiment of the detection phase 2-30. The algorithm inputs 2-10 of this embodiment are the intensity image and target size information. In other embodiments of the inventive method, the generation of magnitude and direction images may be included in a broader characterization of the detection phase 2-30 or the magnitude and direction images may be supplied as input into the inventive method. One such embodiment of the inventive method is depicted in FIG. 2. The Inputs 1000 of this embodiment of the inventive method include a magnitude image and a direction image.

Sobel images are widely known to those in the art as methods for determining edge intensity and edge magnitude in an image, but any form of edge intensity and edge magnitude calculation is suitable for the inventive method. The embodiments described herein use an 8-direction Sobel image for edge generation, but may also be adapted for use with other widely known edge generation methods such as 16-direction Sobel or Canney.

The embodiment of the Detection phase 2-30 shown in FIG. 5 is more specifically characterized as Detect Potential Targets, and the embodiment of the Validation phase 2-50 is more specifically characterized as Validate detected targets. The Algorithm output 2-60 of this embodiment is a target detection list intended for a weapons or tracking system. The overall flow of information and general functional breakdown, however, is the same in FIGS. 4 and 5. The specific embodiments differ in their application and purpose, but the flow of information and overall areas of function remain the same.

Figure 6:
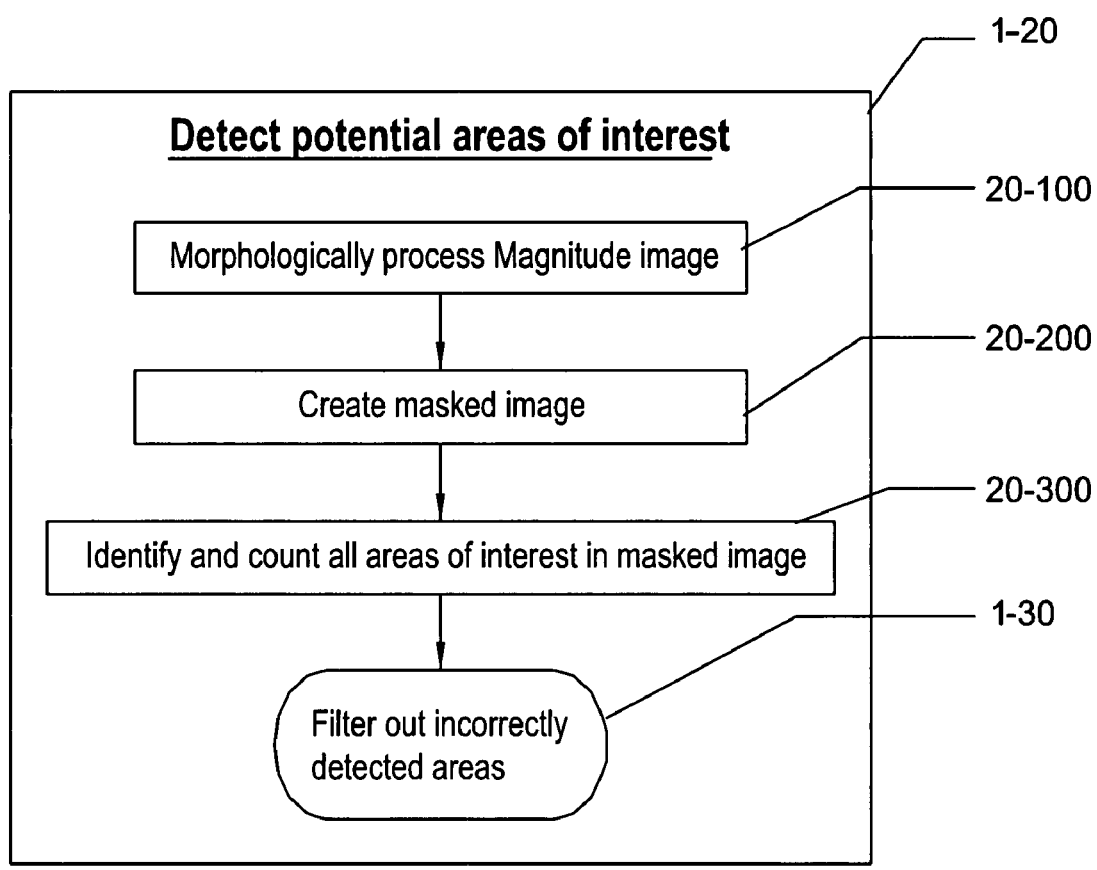
FIG. 6 illustrates an embodiment of the detection aspect of the inventive method in a high-level flowchart.

FIG. 6 illustrates an embodiment of the Detection phase 1-20. This embodiment of the Detection phase 1-20 is characterized as Detect potential areas of interest and is composed of three phases, the first of which is morphological processing of the magnitude image 20-100. This phase is concerned with clarifying and enhancing the image for further processing through morphological techniques.

Figure 7:
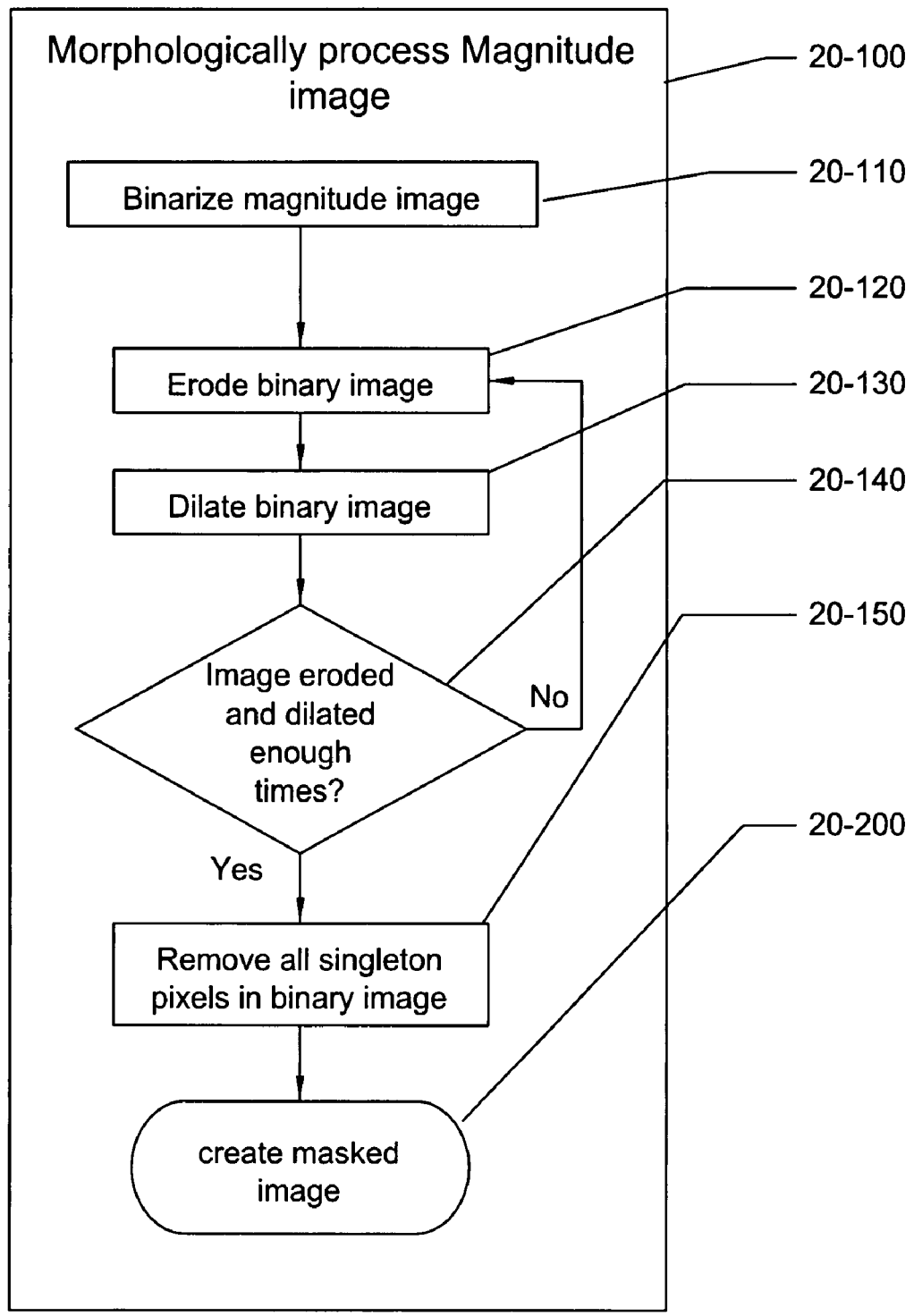
FIG. 7 describes an embodiment of a portion of the inventive method where a magnitude image is morphologically processed.

FIG. 7 illustrates an embodiment of the morphological processing phase 20-100. This embodiment of the morphological processing phase begins with binarization of the magnitude image 20-110. This clears the magnitude image of all pixels that do not meet a minimum threshold magnitude value. The binarized image is then eroded 20-120 and dilated 20-130 a certain number of times 20-140. The erosion and dilation operations in this embodiment are performed using a 3×3 image mask. The use of image masks in erosion and dilation operations is well known in and of itself and specific mask configurations are algorithm-specific such that they may be determined by one of ordinary skill in the art. The number of erosions and dilations required in this embodiment are part of the detection parameters supplied as input into the inventive method, and may range from zero to four erosions and/or dilations. This means that this embodiment may include only erosions, only dilations, a combination of the two, or no erosion or dilation at all. The number of erosions and dilations in other inventive embodiments may be fixed in the system or determined through interactive testing of an embodiment.

In other embodiments of the inventive method, the morphological processing accomplished through the cycles of erosion and dilation may not be necessary. Alternatively, different size and shape pixel mask may be employed, only dilations or only erosions may be performed, or the sequence of erosion and dilation may be switched to generate a different morphological effect. The number of erosions or dilations required, if any, may be supplied directly by the user, determined from the image data itself, or ascertained by some other available means in other embodiments of the inventive method.

In this embodiment of the inventive method, the binarized image is then stripped of singleton pixels 20-150, which are pixels that are not at least 8-connected to any other pixels to remove any remaining noise after a sufficient number of erosions and dilations 20-140 have taken place. Other embodiments of the inventive method may omit this step or may remove pixels based on different parameters or settings. For example, all singleton pixels and all 8-connected pixel pairs may be removed in an alternative embodiment of the inventive method.

In other embodiments, all pixels except those having a certain size and shape may be removed during morphological cleaning. If an embodiment of the invention is intended specifically to locate rectangular objects, all pixels with less than 3 adjacent nonzero pixels may be removed. If an embodiment of the invention is meant to locate only large, round objects, pixel clusters less than a certain size may be removed from consideration at this step of the inventive method. Other criteria for morphological cleaning may include compactness or a ratio of perimeter to area.

Once morphological processing 2-100 is complete, a masked image is created 20-200 by multiplying together the morphologically processed magnitude image and the original intensity image. Because the morphologically processed magnitude image is binary, this results in a masked image that only contains intensity pixels in the non-zero areas of the morphologically processed magnitude image. In other embodiments of the inventive method, the masked image may not be necessary, or the entire morphological processing operation may be conducted on the intensity image, the direction image, or some other from of image data.

In an embodiment of the inventive method all areas of interest are identified and counted 20-300 after a masked image is created 20-200. One embodiment of the identification and counting phase 20-300 entails the use of a component labeler with 8-connectivity logic. A component labeler working on 8-connectivity logic identifies as a single continuous area any group of pixels where each pixel is at least 8-connected to another pixel. To be 8-connected, a pixel must touch an adjacent pixel either with a side or a corner. Other embodiments may employ different methods to identify and count detected areas of interest, such as looking for a specific size, shape, intensity profile or other area metric, and not all areas of interest may be counted. Different connectivity logic, such as 4-connectivity logic, may be used to potentially reduce or increase the size and distribution of marked areas of interest.

The areas of interest being detected and counted, an embodiment of the inventive method may then moves to an embodiment of the Filtering phase 1-30, specified here as Filter out incorrectly detected areas.

Figure 8:
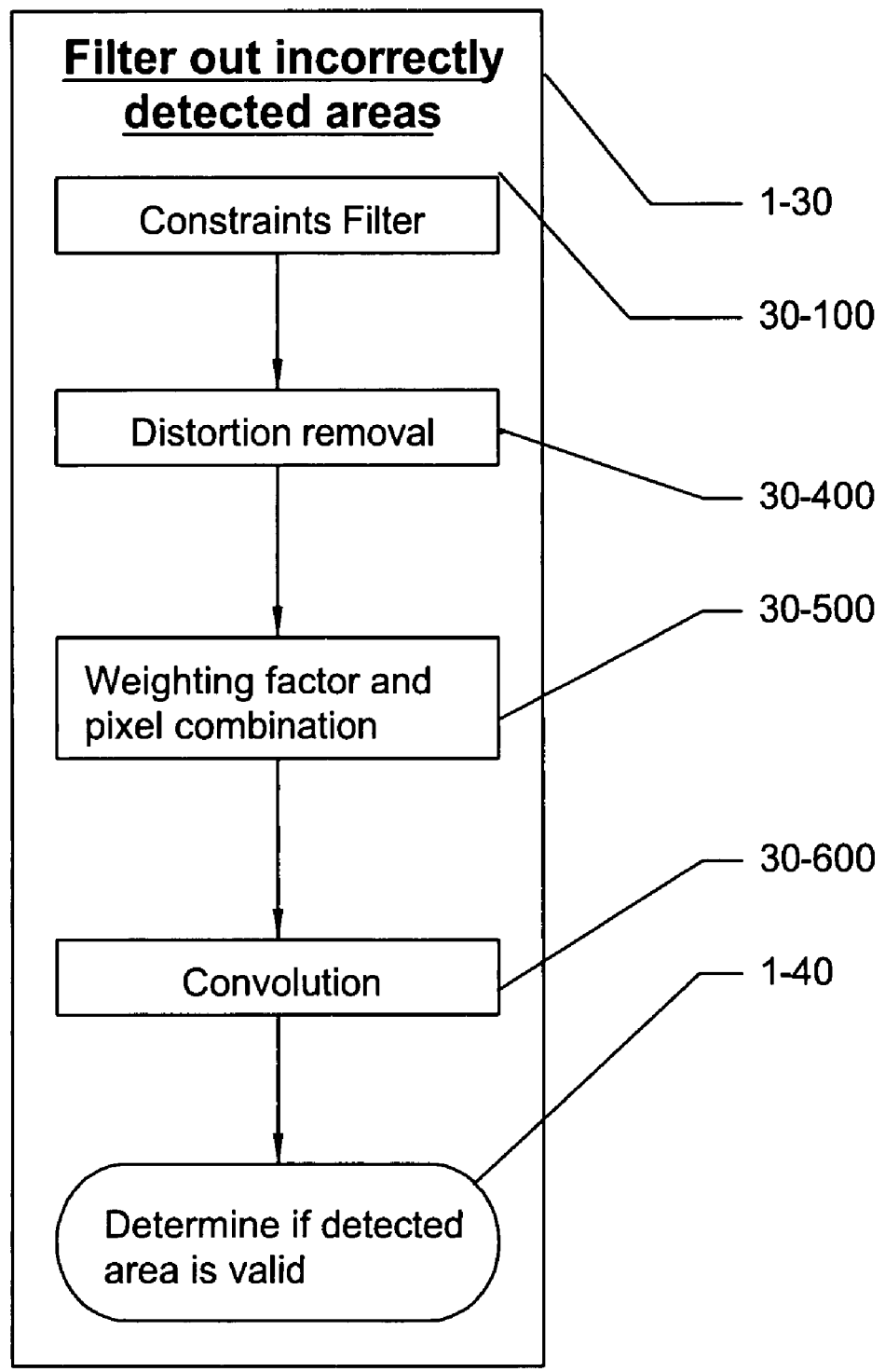
FIG. 8 illustrates an embodiment of the filtering aspect of the inventive method in a high-level flowchart.

FIG. 8 illustrates an embodiment of the Filtering phase 1-30. This embodiment of the filtering phase may be multi-threaded, meaning that it is capable of operating on multiple areas of interest at one time. Any parallel processing at this stage of an embodiment of the filtering phase will reduce the amount of time needed to filter out incorrectly detected areas of interest. Faster processing times may also allow embodiments of the inventive method to operate at higher frame rates of image data, improving the accuracy of the results. Embodiments of a multi-threaded filtering phase may be accomplished through the use of parallel processing, pipeline processing, distributed computing, or any other means of simultaneously processing multiple data elements. Other embodiments of the invention may employ parallel processing in any of the phases where it may be possible to do so. Generally, in software applications, any set of steps that can be accomplished with a 'for' loop is a candidate for parallel processing.

Figure 9:
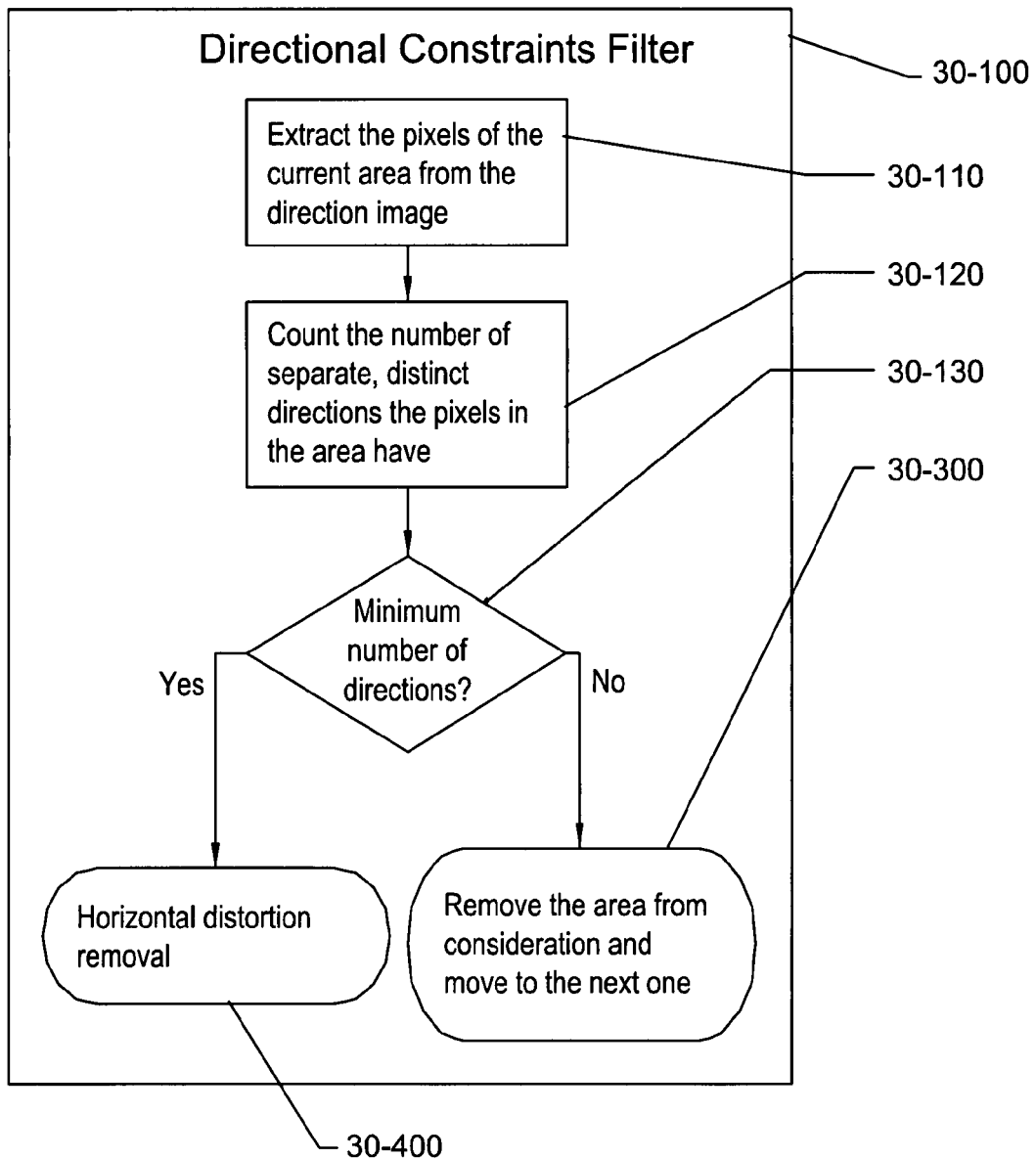
FIG. 9 describes an embodiment of a portion of the inventive method where a direction image is evaluated to determine the general shape of an area of interest.

This embodiment of the Filtering phase 1-30 begins with the application of a Constraints filter 30-100. An embodiment of the Constraints Filter specified as a Directional Constraints Filter 30-100 is illustrated in FIG. 9.

This embodiment of the Directional Constraints Filter 30-100 eliminates from further consideration any detected areas of interest that do not have a certain minimum number of edge directions. In alternative embodiments of the directional constraints filter 30-100, the minimum number of edge directions may be a number provided in the detection parameters, externally provided, or calculated based on characteristics of the image data being analyzed. As the minimum number of edge directions increases, the shape of an area that passes a directional constraints filter is ever more likely to be that of an oval. This is especially useful for identifying areas of interest at ranges where they are not crisply resolved because while the exact shape of the area may be unclear, the edge direction and magnitude images of the area are usually oval in shape. This embodiment of the directional constraints filter 30-100 may require anywhere from 3 to 6 minimum edge directions. The specific minimum number used in any given iteration is determined by the detection parameters. Alternative embodiments of the directional constraints filter may require user input of the minimum number of directions, or may dynamically calculate it based on features or conditions detected in the image data or by other associated sensors.

This embodiment of the directional filtering process begins by extracting pixels from the direction image that correspond to the pixels in the area of interest the filter is operating on 30-100. Once extracted, these pixels are counted to determine the total number of separate, distinct directions these pixels have 30-120. If the counting process 30-120 results in more than a certain minimum number of directions 30-130, the area is considered to be of a valid shape and moves to the next step of the filtering phase of this embodiment of the inventive process—the horizontal distortion removal 30-400. If, however, the counting process 30-120 does not produce more than the minimum number of directions 30-400, the area being operated on is considered invalid and, in this embodiment of the inventive process, is discarded from further consideration 30-300 by assigning the pixels in that area of interest a value of zero.

An embodiment of the counting process 30-120 may entail using an array where each cell in the array represents a pixel direction. The array may initially be populated with all zero values, and the value of the appropriate cell of the array incremented each time a particular direction is encountered. If, at the conclusion of counting the pixels in the direction image corresponding to the area of interest being filtered, the number of non-zero cells in the array meets or exceeds the minimum number of directions set in the detection parameters, the area of interest is considered to be sufficiently oval-shaped to warrant further processing.

Other embodiments of the Filtering phase 1-30 may use a different form of Constraints Filter 30-100 based on intensity or magnitude, or may use a different embodiment of directional filtering. Other embodiments of the directional constraints filter 30-100 may look at intensity gradients, surface area, perimeter to area ratios, or may attempt edge-tracing to determine the shape of an area of interest.

In an embodiment of the Filtering phase 1-30, if an area of interest passes the Constraints Filter 30-100, it then undergoes an embodiment of Distortion removal 30-400. Distortion removal is a step where background elements, glare, reflected signals, or other elements that may distort an area of interest during initial detection are isolated and removed. Embodiments of distortion removal may vary depending upon the specific application an inventive embodiment is being tailored for.

Figure 10:
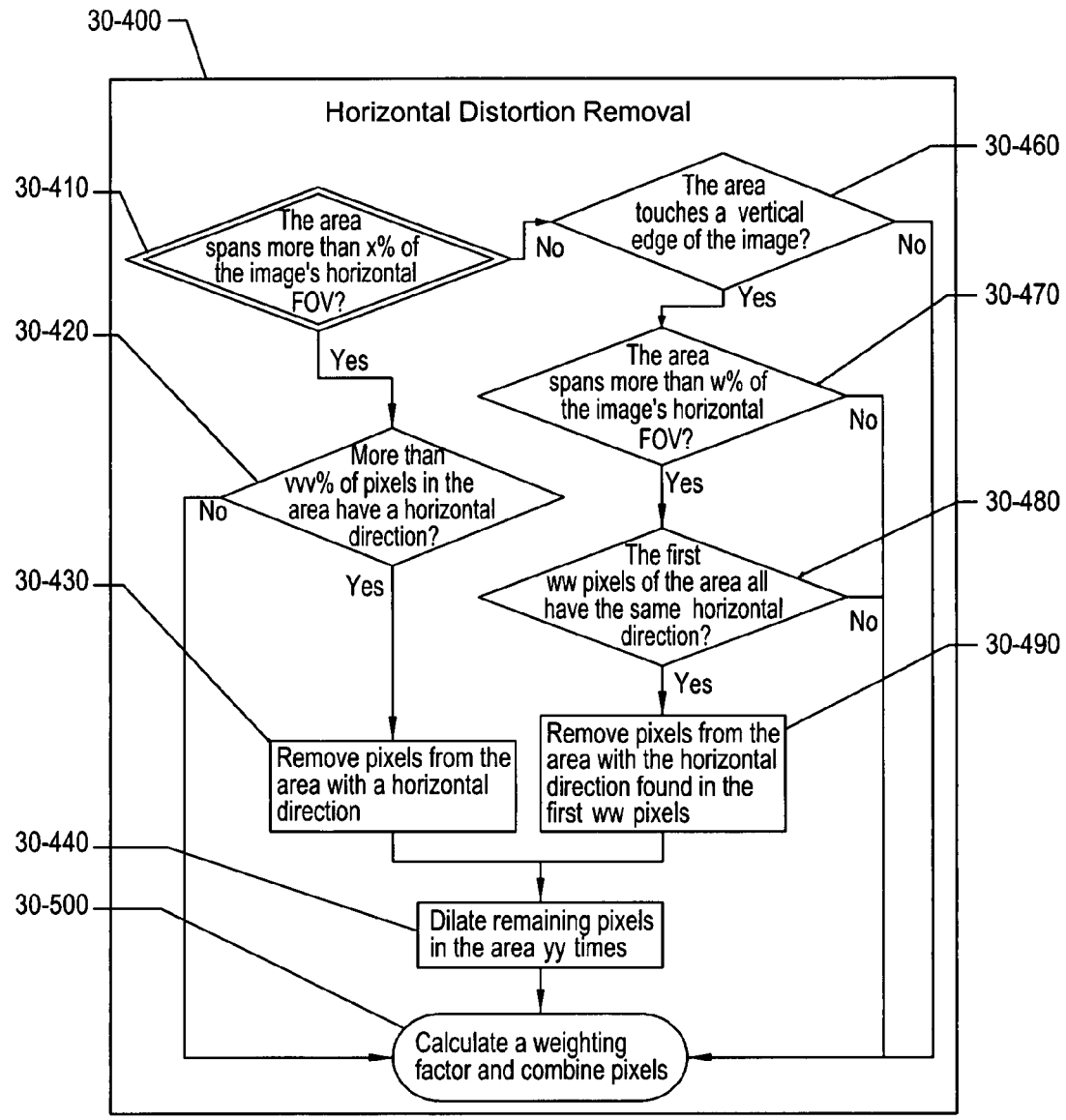
FIG. 10 describes an embodiment of a portion of the inventive method where a masked image is cleaned of horizontally-oriented distortions.

One embodiment of Distortion removal is Horizontal distortion removal 30-400, an embodiment of which is depicted in FIG. 10. This is a form of noise and distortion removal where horizon lines and littoral lines and other undesirable effects with a horizontal direction are removed. Such an embodiment of Distortion Removal is appropriate for an embodiment of the inventive method intended for maritime applications where shorelines, horizon lines, sunrises, sunsets, and reflected glare from the water are the most significant impediments to accurate detection. Other embodiments of the inventive process, such as an embodiment intended for image analysis of PET scans, may replace this step with one that compensates for other distortion sources, such as the effects of ambient electromagnetic fields, or may omit this step entirely. Further alternative embodiments of distortion removal may include intensity-based distortion removal, median filtering, or salt and pepper noise removal.

This embodiment of Horizontal Distortion Removal 30-400 begins by determining whether the area of interest occupies more than a certain percentage of the input image's horizontal field of view (FOV) 30-410. This is accomplished by calculating the maximum pixel width of the area of interest and dividing it by the total pixel width of the intensity image, which is determined by the resolution of the detector being used. The certain percentage is a user-defined parameter that can be customized depending on the amount of horizontal noise expected. This percentage may also be hard-coded or iteratively adjusted by a user depending on the type of imagery being viewed and the objects of interest being sought after. This embodiment of the horizontal distortion removal 30-400 process uses a number between 45% and 80%. The specific number used in any given iteration is determined by the detection parameters. Alternative embodiments of the horizontal distortion removal process may require user input of this percentage, or may dynamically determine it based on features or conditions detected in the image data or by other associated sensors.

Other embodiments of Horizontal Distortion Removal 30-400 may employ an absolute pixel width or a width/height ratio on an area of interest to determine whether it has potentially been subject to horizontal distortion, or may evaluate the area against a threshold percentage of background noise or other defined criteria. Still other embodiments of Horizontal Noise Distortion 30-400 may not bother with such an initial check and assume that all areas of interest are potentially horizontally distorted.

In an embodiment of the Horizontal Distortion Removal 30-400, if the area of interest does occupy more than that certain percentage of the horizontal FOV, the first step in identifying distorted pixels is to determine whether an area of interest is comprised of more than a threshold percentage of horizontally-oriented pixels 30-430. This is accomplished by counting all the pixels in the direction image corresponding to the area of interest undergoing distortion removal and dividing that by the total number of pixels in the area of interest in the direction image. If this calculation on an area of interest meets or exceeds the threshold percentage, which is a user-defined parameter ranging from 0.5 to 0.85, all the horizontally oriented pixels are removed from the area of interest 30-430 and the remaining pixels in the area of interest are dilated a certain number of times 30-440 with a 3×3 pixel mask to fill any holes in the area of interest created by the pixel removal 30-430. The number of dilations may be a user-defined value included in the detection parameters or may depend on the pixel removal threshold percentage. This embodiment of this step of the inventive method may employ anywhere from 0 to 3 dilations depending on the detection parameters.

Other embodiments of the Horizontal Distortion Removal 30-400 may omit a threshold percentage check for horizontal pixel content 30-420, use a different range of threshold percentage values for that check, or may replace this step with a different process such as one which includes diagonally oriented pixels. Other embodiments of the Horizontal Distortion Removal 30-400 may also alter the type of mask used in dilation, the number of dilations, or replace or omit the dilation step completely. For example, an alternative embodiment may use a morphological closing process instead of pure pixel dilation to fill in gaps created by pixel removal.

In an embodiment of Horizontal Distortion Removal 30-400, if an area of interest does not occupy more than that certain percentage of the horizontal FOV of the image, the next step is to determine if that area of interest touches a vertical edge of the image 30-460. This is done by checking to see if any pixels within the area of interest come within a specified number of pixels of the edge of the image. This embodiment of this step of the inventive method may use a number of pixels between 1 and 7, determined by the detection parameters. Other embodiments may hardcode a value, employ a threshold percentage, or omit this step altogether.

If an area of interest does touch a vertical edge of the image, the area of interest is checked to determine if it spans more than a percentage of the image's horizontal FOV 30-470. This is accomplished by calculating the maximum pixel width of the area of interest and dividing it by the total pixel width of the intensity image, which is determined by the resolution of the detector being used. The certain percentage is a user-defined parameter that can be customized depending on the amount of horizontal noise expected. This embodiment of this step of the inventive method may use a threshold percentage between 25% and 50%. Other embodiments of Horizontal Distortion Removal 30-400 may employ an absolute pixel width or a width/height ratio on an area of interest to determine how much horizontal character it has. Still other embodiments of Horizontal Noise Distortion 30-400 may use a different percentage range, a dynamically determined range, or may not bother with such a check and assume that all areas of interest touching a vertical edge of the image are horizontally distorted.

In an embodiment of the Horizontal Distortion Removal 30-400, if an area of interest touches a vertical image edge 30-460 and occupies more than a percentage of the image's horizontal FOV 30-470, the first several pixels of the direction image corresponding to the area are examined starting with the leftmost pixel and moving right. The number of pixels to be examined is determined by the detection parameters. In this embodiment of this step of the inventive method, the number of pixels may range from 8 to 15. Other embodiments may examine a percentage of total pixels in the area, all the pixels in the area, or omit this step.

The determined number of pixels are examined to see how many of them are horizontal in nature. If the number of horizontal pixels found divided by the total number of pixels examined exceeds a predefined threshold percentage, then it is assumed that this area of interest needs to be processed further. This embodiment of this step of the inventive method uses a percentage in the range of 80% to 100%, with an exact number being determined in the detection parameters. The predefined threshold percentage may also be hard-coded. Still other embodiments of this phase of the inventive method may allow for external input or dynamic calculation of the threshold percentage or may default to examining all pixels.

If all of these examined pixels have the same horizontal direction 30-480, all pixels in the area of interest with that horizontal direction are removed 30-490 and the remaining pixels in the area of interest are dilated 30-440 with a proprietary 3×3 pixel mask to fill any holes in the area of interest created by the pixel removal 30-490. Embodiments of this step of the inventive method may call for multiple pixel dilations, with the number of dilations being determine by the specific environment the inventive embodiment is meant to operate in. This embodiment of the inventive step may call for anywhere from 0 to 3 dilations, with the actual number of dilations for a given iteration being determined by the detection parameters.

Other embodiments of the Horizontal Distortion Removal 30-400 may omit a pixel-by-pixel check for horizontal pixel content 30-480, use a threshold percentage check instead, or may replace this step with a different process such as one which includes diagonally oriented pixels. Other embodiments of the Horizontal Distortion Removal 30-400 may also alter the type of mask used in dilation, perform dilation without a pixel mask, increase or decrease the number of dilations, or replace or omit the dilation step completely. For example, an alternative embodiment may use a morphological closing process instead of pure pixel dilation to fill in gaps created by pixel removal.

Figure 11:
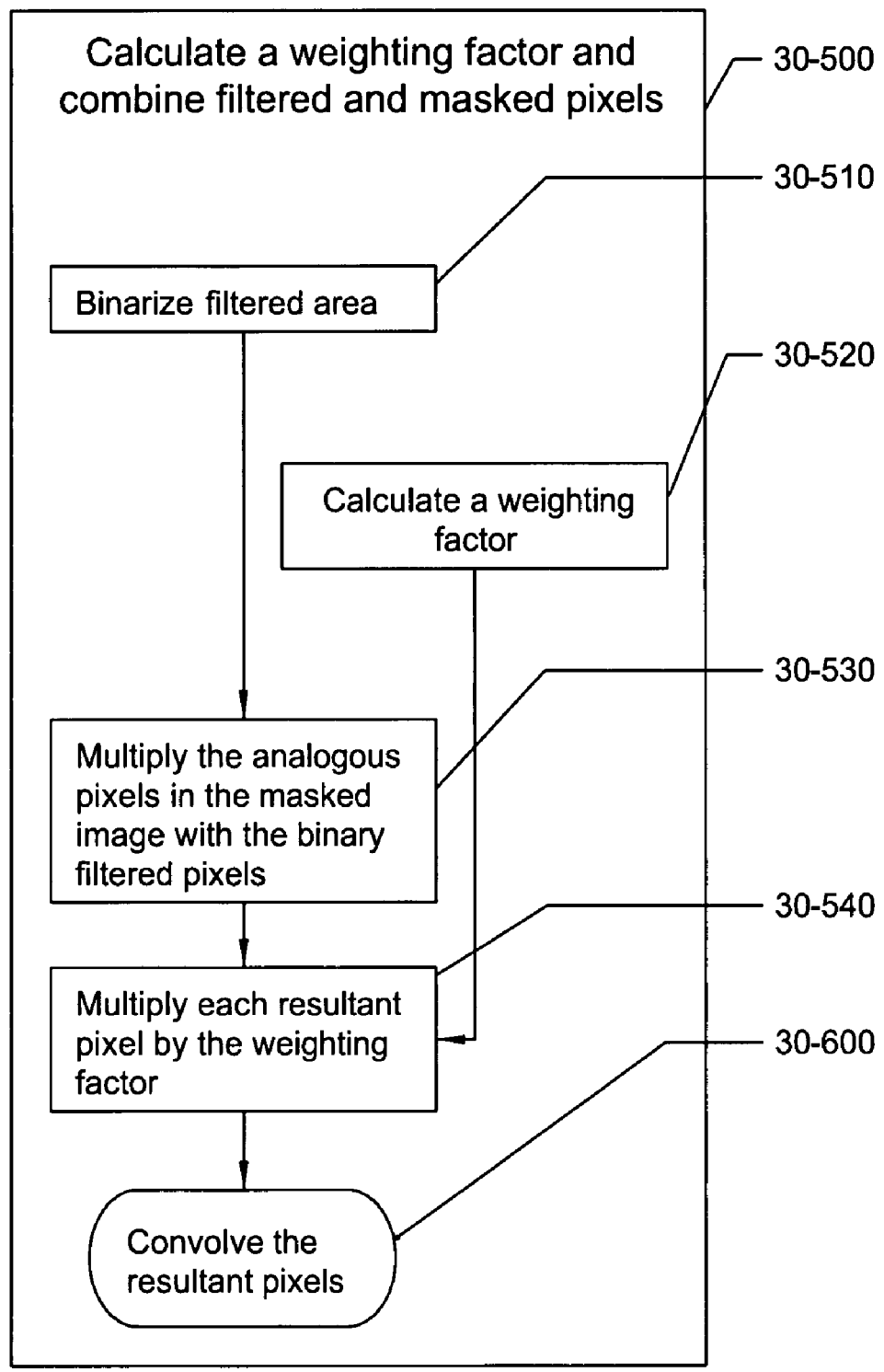
FIG. 11 describes an embodiment of a portion of the inventive method where an area of interest is enhanced for improved contrast.

At the completion of Horizontal Distortion Removal 30-400, an embodiment of the inventive method may proceed to a Weighting Factor and Pixel Combination phase 30-500 to enhance the contrast between the area of interest and the background. This helps to further distinguish multiple areas of interest from each other. An embodiment of the Weighting Factor and Pixel Combination phase 30-500 is depicted in FIG. 11, where it is specified as Calculate a weighting factor and combine filtered and masked pixels 30-500.

The weighting factor is applied in this embodiment to adjust intensities of areas of interest that may have been merged on initial detection but have since been broken apart as a result of the morphological processing 20-100, directional constraints filtering 30-100, and horizontal noise removal 30-400. The merging process in this inventive embodiment would cause the intensities of the various areas of interest to appear uniform with respect to each other. The weighting factor is used to adjust the intensities of the remaining areas so that the areas of interest will have an appropriate intensity for further processing.

In embodiments where areas of interest are not commonly merged on initial detection or where the intensity of detected objects or areas is expected to be relatively uniform, the Weighting Factor and Pixel Combination phase 30-500 may be modified, omitted or replaced with different functionality. In an embodiment used with an active illumination source, such as RADAR, a weighting factor may be unnecessary because an expected intensity of illumination on the target will be available for an absolute comparison. Embodiments of the inventive method may need to be tailored to work with an active sensor. This may entail removing sections, enhancing other sections, or modifying or adjusting parameters depending on the specific kind of active sensor, intended operating environment, and desired types of detections.

This embodiment of the Calculate a weighting factor and combine filtered and masked pixels process 30-500 begins by binarizing a filtered area of interest where the weighting factor will be applied 30-510 and calculating a weighting factor 30-520 as the mean value of the pixels analogous to the filtered area of interest from the magnitude image. The binarization creates a mask of the filtered area that may be applied to the input image data to eliminate pixels that have already been filtered out. The pixels in this binarized mask are multiplied with the analogous pixels from the masked image 30-530 to produce a second masked image, this one showing only the remaining intensity pixels in an area of after the initial filtering and pixel removal processes. These pixels are multiplied by the calculated weighting factor 30-540 so that their intensity does not appear artificially high or low based on the intensities of other areas of interest or other sources of noise or distortion.

Other embodiments of the Filtering phase 1-30 may replace or omit the Weighting Factor and Pixel Combination phase 30-500. Other embodiments of the Weighting Factor and Pixel Combination phase not use a weighting factor or may employ a different weighting factor, such as a maximum, minimum, or median pixel value or a set factor not directly determined by pixel intensity. The creation of a binary mask may also be omitted or modified in other embodiments of the Weighting Factor and Pixel Combination phase 30-500. Varying embodiments may be appropriate depending on desired performance levels, hardware constraints, operating environment, or other similar factors.

At the completion of the Calculate a weighting factor and combine filtered and masked pixels 30-500 process, an embodiment of the inventive method may proceed to perform a convolution 30-600 on the results of the Weighting Factor and Pixel combination phase 30-600.

An embodiment of the convolution process 30-600 depicted in an embodiment of the Filtering phase 1-30 is a 2-d convolution performed using a predefined, proprietary kernel that may range in size from 3×3 to 9×9 depending on the type of filtering specified in the detection parameters. Filtering options may include Gaussian lowpass, averaging, circular averaging, Laplacian, linear, non-linear, sharpening, or unsharpening. Other embodiments of the convolution process 30-600 may employ different size and shape kernels and may operate on more or fewer dimensions. This embodiment of the convolution process helps to smooth out pixel intensities in the area of interest. An area of interest that has multiple hot spots would be smoothed out by the convolution process so that only 1 general hotspot is left. This also has the effect of tapering the edges of the area of interest, which facilitates the thresholding process that may follow convolution.

This embodiment of the convolution process may sometimes combine two areas of interest into one. This may happen when two areas of interest are part of the same object of interest. A thresholding process may follow the convolution process to correct any instances of areas of interest being improperly combined.

Figure 12:
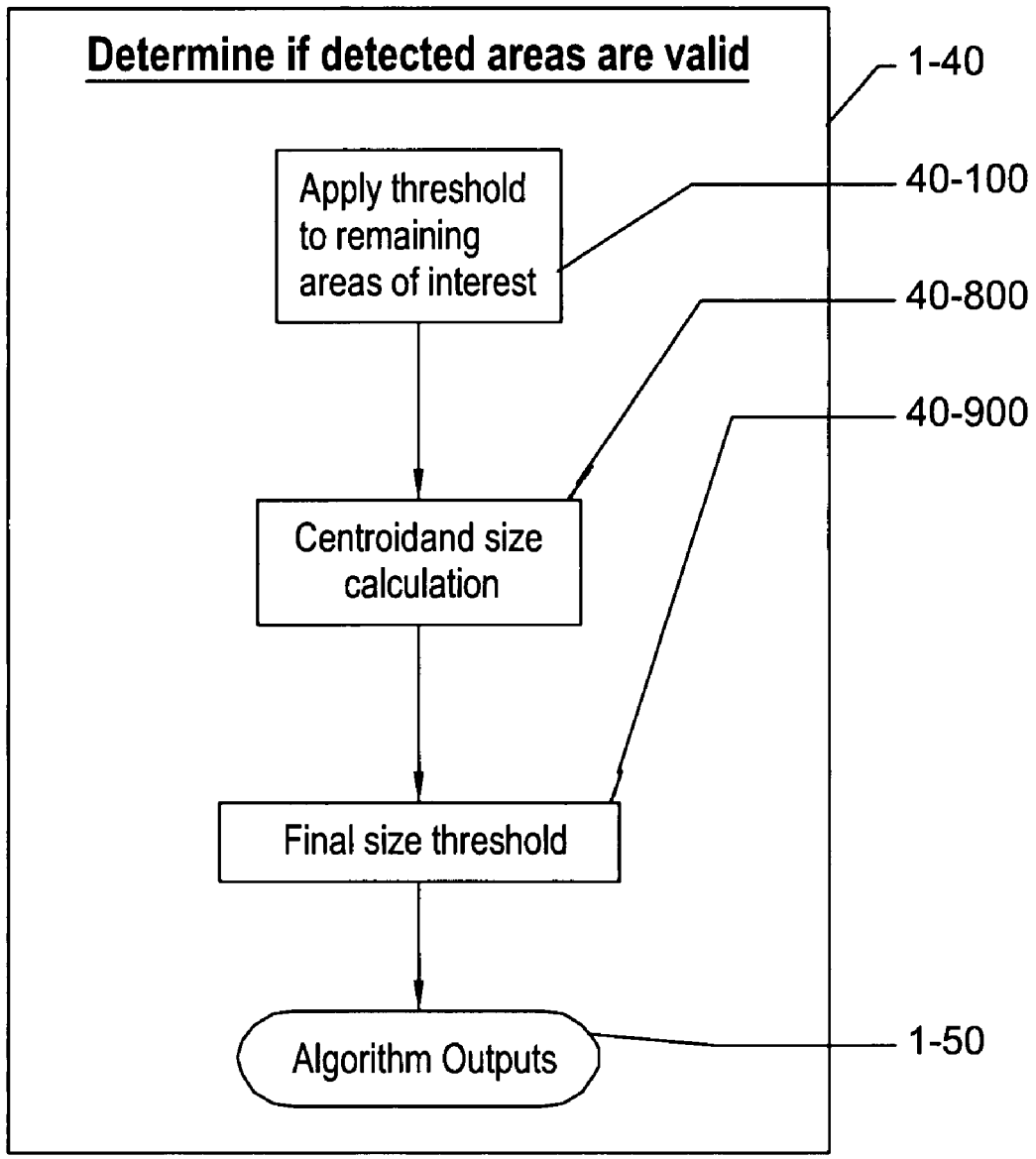
FIG. 12 illustrates an embodiment of the validation aspect of the inventive method in a high-level flowchart.

The convolution process 30-600 is the final part of an embodiment of the Filtering phase 1-30 in this embodiment of the inventive method. At the completion of the Filtering phase 1-30, an embodiment of the inventive method may enter an embodiment of the Validation phase 1-40. An embodiment of the Validation phase 1-40 is depicted in FIG. 12 and specified as Determine if detected areas are valid 1-40.

This embodiment of the Validation phase 1-40 begins with the application of a threshold to remaining areas of interest 40-100. This is done to eliminate those areas of interest that have passed through Filtering phase 1-30 but are either too intense or not intense enough after the application of the weighting factor 30-540. This embodiment of the thresholding process is used to reduce the number of objects of interest that are to be passed on to further processing steps. Because a system usually has a limited amount of processing power available for use by all the systems parts, it is advantageous to reduce the amount of data that requires further processing. This embodiment of the thresholding process is one area where it is possible to reduce the number of detections that are passed on for further processing and analysis. Embodiments of the thresholding process may employ double thresholding or band pass filtering. Yet further embodiments of the thresholding process may require filtering or thresholding operations optimized specifically for the type of data and processor being used and evaluated. In an embodiment of apply threshold to remaining areas of interest 40-100, pixels with an intensity below the threshold value are discarded as insufficiently intense. Areas of interest may either be totally removed or shrunk down by this embodiment of this step of the thresholding process. This eliminates those portions of detected areas of interest that, after the Detection 1-20 and Filtering 1-30 phases, are still not considered valid areas of interest. All eliminated areas are not processed any further.

Figure 13:
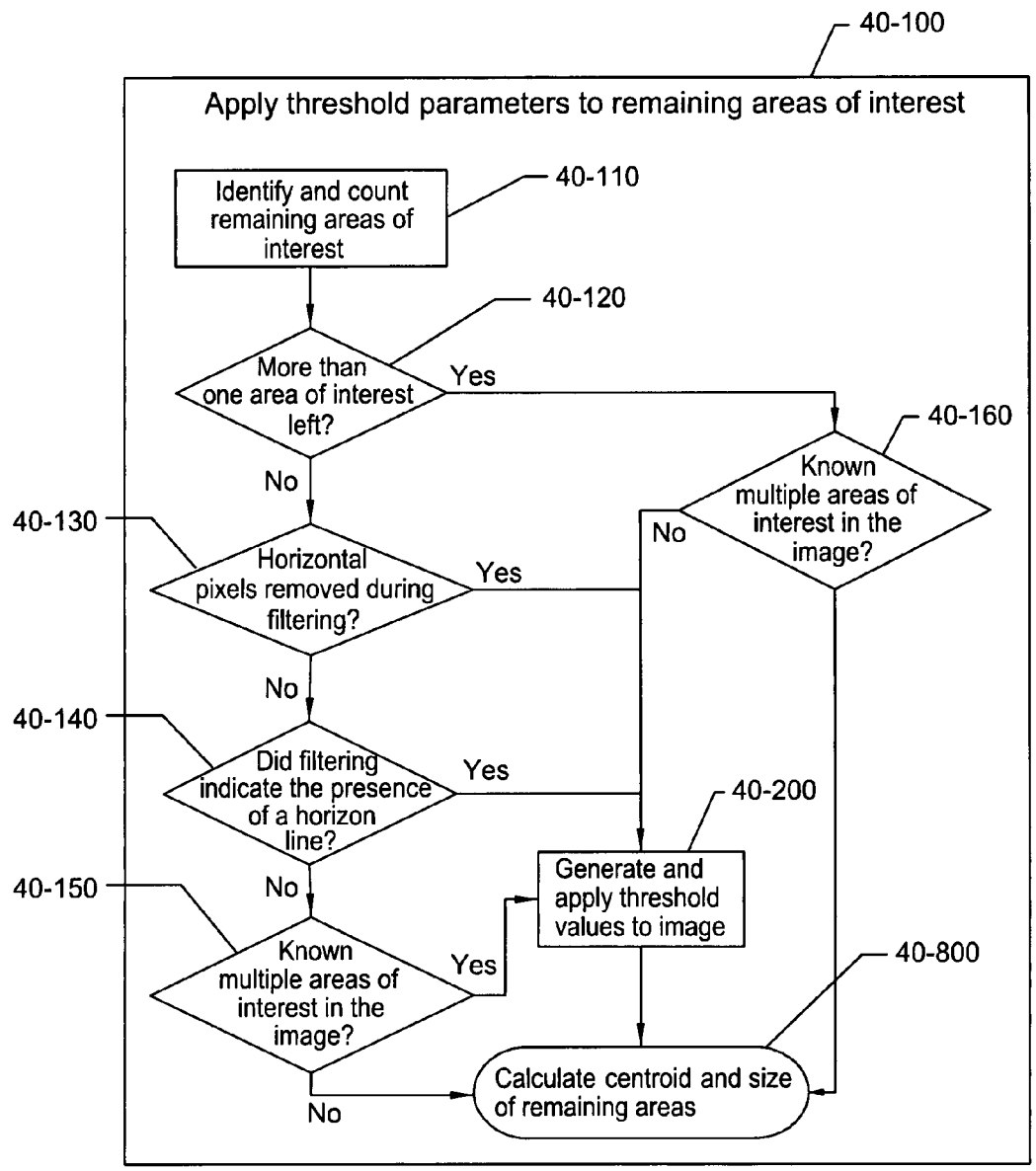
FIG. 13 describes an embodiment of a portion of the inventive method where areas of interest are evaluated against detection thresholds to determine if they are valid detections.

An embodiment of the Apply threshold to remaining areas of interest process 40-100, depicted in FIG. 13, begins with the identification and counting of all remaining areas of interest 40-110. One embodiment of the identify and count remaining areas of interest phase 40-100 entails the use of a component labeler with 8-connectivity logic. Other embodiments may employ different methods, such as 16-connectivity, to identify and count remaining areas of interest, and not all areas of interest may be counted. Different connectivity logic, such as 4-connectivity logic, may be used to potentially reduce or increase the size and distribution of identified areas of interest. An embodiment using 4-connectivity logic may be more suitable for a system with limited processing power.

In an embodiment of the Apply threshold parameters to remaining areas of interest phase 401-00, if only two areas are present and detection parameters indicate the expected presence of multiple targets in the image 40-160, then the phase 40-100 concludes without generating and applying any threshold parameters and instead this embodiment of the Validation phase 1-40 moves on to the calculation of the centroid and size step 40-800

In an embodiment of the Apply threshold parameters to remaining areas of interest phase 401-00, it may be necessary to determine if a horizon line is present in the scene and, if it is, how close it is to the top of the image. If a horizon line is present in the image, a horizon flag variable is set. If the horizon line it is not within some predefined distance in pixels then the horizon flag value is considered not valid.

In an embodiment of the Apply threshold parameters to remaining areas of interest phase 401-00, if there is only one area of interest remaining 40-120 and no horizontal pixels were removed from section 40-130 or the horizon flag value is not valid and detection parameters do not indicate the expected presence of multiple areas of interest in the image 40-150, then the phase 40-100 concludes without generating and applying any threshold parameters and instead this embodiment of the Validation phase 1-40 moves on to the calculation of the centroid and size step 40-800.

Figure 14:
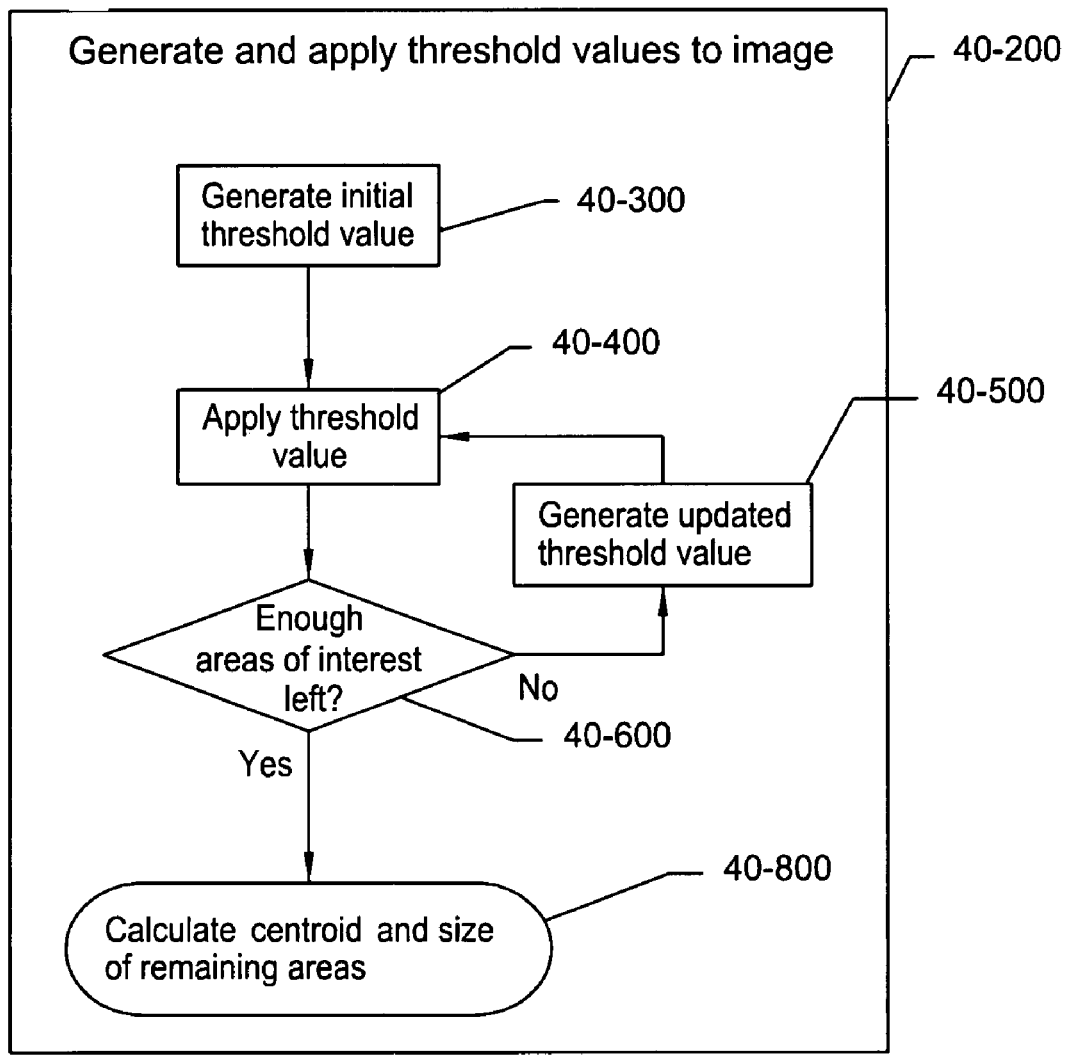
FIG. 14 describes an embodiment of a portion of the inventive method where detection thresholds are generated, applied, and updated as appropriate.

If, however, any of the above conditions are not met in that embodiment of the Apply threshold parameters to remaining areas of interest phase 40-100, then the image is subject to thresholding and a threshold value must be generated and applied 40-200. An embodiment of the Generate and apply threshold values to image process 40-200 is depicted in FIG. 14.

In this embodiment of the Generate and apply threshold values to image process 40-200, an initial threshold value is generated 40-300 and applied to the image 40-400. An embodiment of the Generate initial threshold value 40-300 process is accomplished using the following pseudo-code. The variable thresh_val is the threshold value and blob_img is the name of the image file containing the areas of interest that remain after the image data passes through an embodiment of the Filtering phase 1-30:

```
Factor =         kk1
img_stat =       median value of all nonzero pixels in blob img
std_val =        standard deviation of all nonzero pixels in blob img
if img_stat > (std_val*yy)
    img_stat = mean value of all nonzero pixels in blob img
    factor = kk2;
end
if known multiple targets are within one target length of each other
    img_stat = mean value of all nonzero pixels in blob img
    factor = kk3;
end
thresh_val = img_stat + factor*std_val;
```

Once calculated, this initial threshold value is applied to all the pixels in the image 40-400. Application of the generated threshold in this embodiment is accomplished by discarding from an area of interest those pixels whose intensity is below the generated threshold by zeroing out those pixels within the image.

Figure 15:
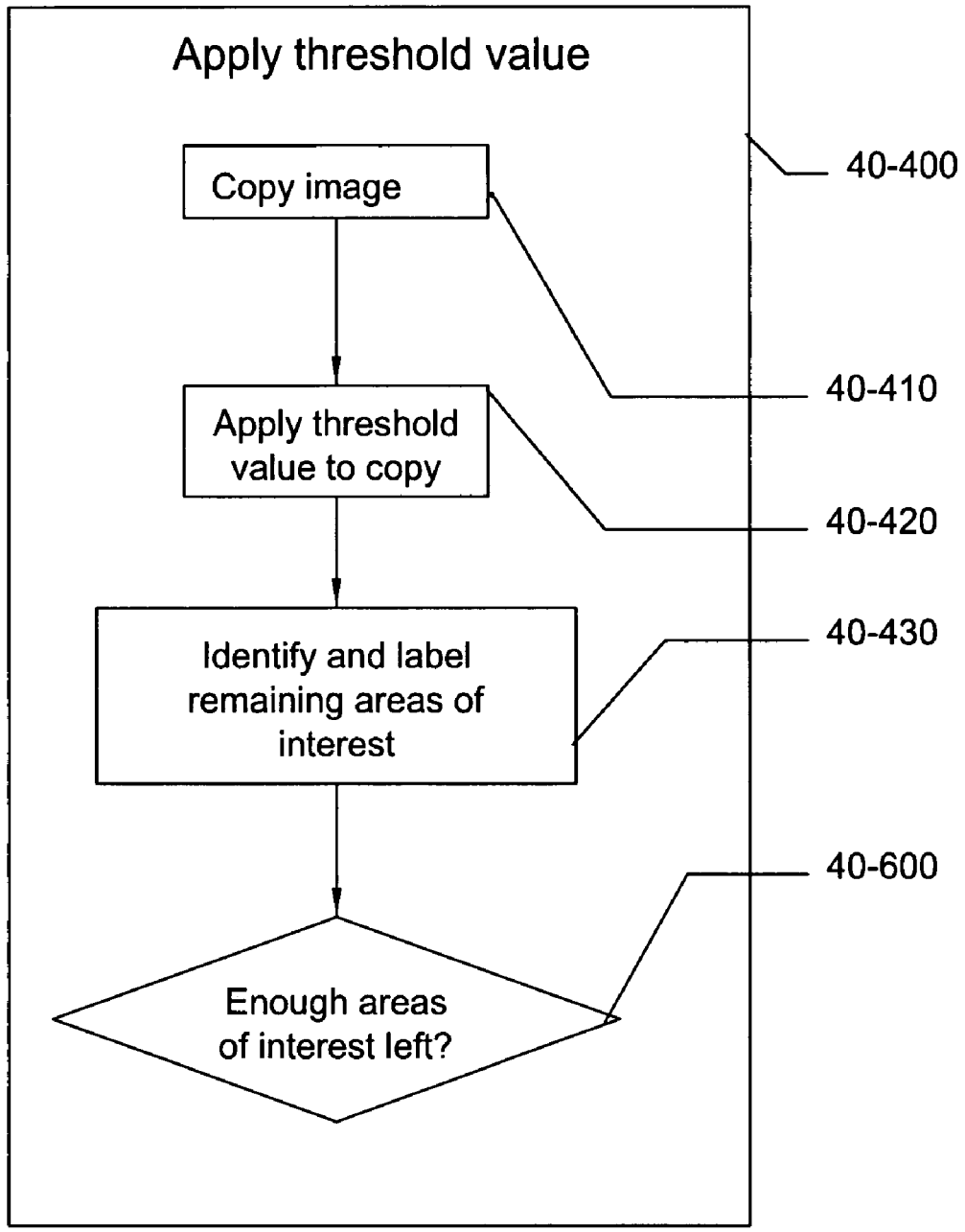
FIG. 15 describes an embodiment of a portion of the inventive method that relates to the application of a threshold value to an image.

FIG. 15 depicts and embodiment of the Apply threshold value step 40-400 in this embodiment of the Generate and apply threshold values to image process 40-200. This embodiment of the Apply threshold value step 40-400 begins by making a copy of the image 40-410. Then the threshold value is applied to the entire image at once 40-420, creating a binary resultant image which is multiplied with the original image to create a thresholded image.

An embodiment of the previously described component labeler process is then applied to regenerate the new thresholded areas of interest 40-430 in the thresholded image. This newly labeled copy of the image 40-400 will serve as the Image to be processed if another threshold value has to be subsequently generated. In other embodiments of the Apply threshold value process 40-400, pixels whose value is greater than or within a certain percentage of the threshold value may be discarded. There are many possible alternative embodiments of this process, and each way could generate different results. Only through testing could it be determined if another thresholding method was suitable for another embodiment of the inventive method.

In this embodiment of the Generate and apply threshold values to image process 40-200, the image is checked after threshold application 40-400 to determine whether it has the proper amount of areas of interest remaining 40-600. If there are not enough areas of interest left in the image 40-600, an updated threshold value is generated 40-500 and applied to the image 40-400. If there are still not enough areas of interest left in the image, the threshold generation, application, and image checking process repeats itself again.

Figure 16:
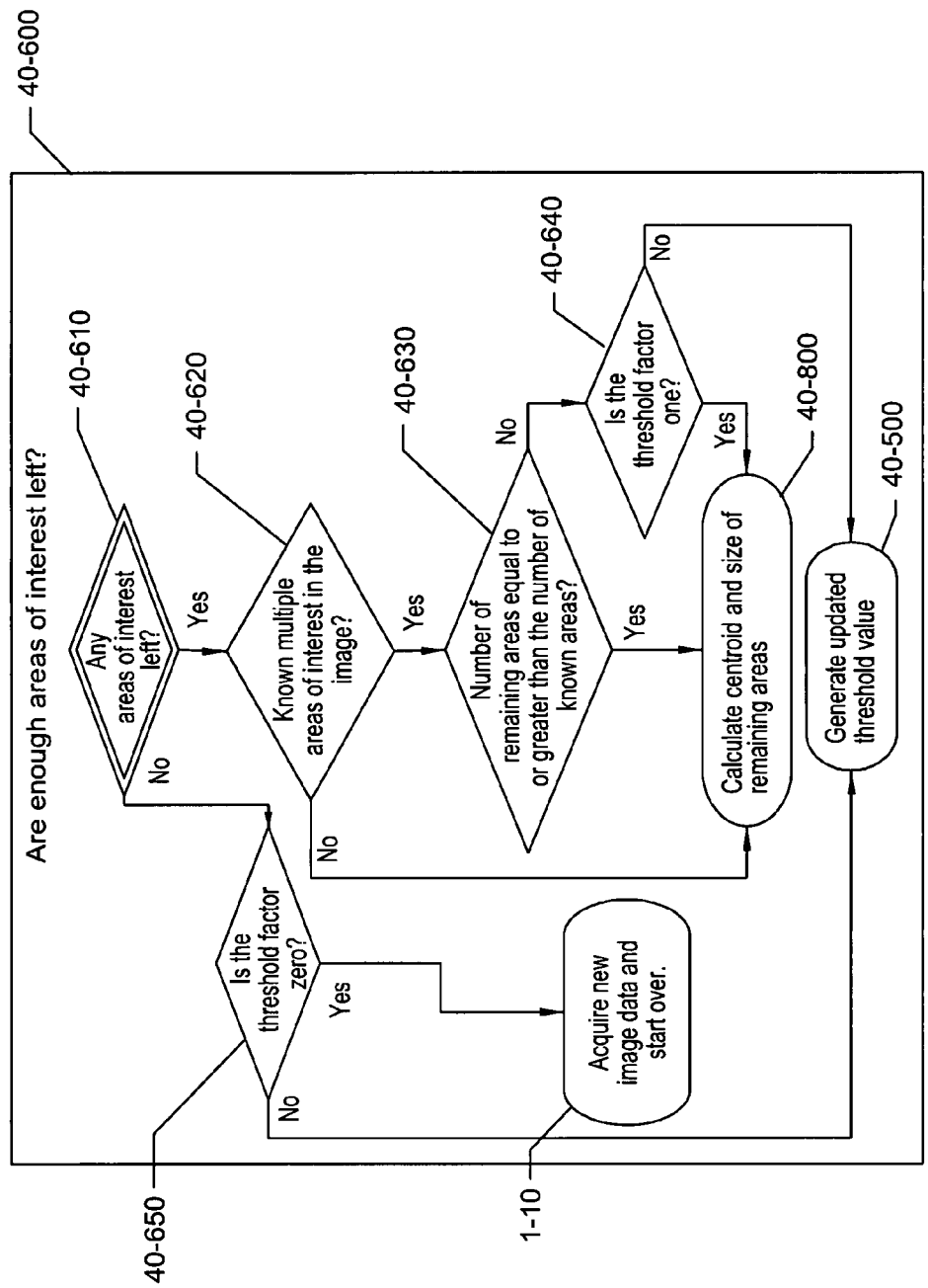
FIG. 16 describes an embodiment of a portion of the inventive method that relates to determination of whether there are a proper number of remaining areas of interest.

The proper amount of remaining areas of interest 40-600 is determined in this embodiment of the Generate and apply threshold values to image process 40-200, by examining both the number of areas of interest remaining after thresholding and the value of the threshold factor, represented as Factor in the above pseudo-code. An embodiment of this determination process is depicted in FIG. 16. The flowchart representing this embodiment of the Are enough areas of interest left process 40-600 begins by determining if any areas of interest are left 40-610. If there are no areas left, the threshold factor is checked to determine whether it is zero 40-650. A nonzero threshold factor results in the generation of an updated threshold value 40-500, while a threshold factor of zero indicates that thresholding is done and the algorithm should start over 1-10.

If there are areas of interest remaining, the detection parameters are checked to determine if there are known multiple areas of interest expected in the image 40-620. If there aren't, this embodiment of this step of the inventive method 40-600 proceeds to calculate the size and centroid of the remaining areas 40-800. If multiple areas of interest are expected according to the detection parameters, the number of remaining areas is compared against the number of expected areas 40-630. If there are as many or more remaining areas as there are expected areas, or if the threshold factor is one 40-640, this embodiment of this step of the inventive method 40-600 proceeds to calculate the centroid and size of the remaining areas. If the threshold factor is not one 40-640 and there are fewer remaining areas than expected 40-630, an updated threshold value is generated 40-500.

Alternative embodiments of this process may entail flagging pixels or areas of interest for further analysis or a second round of the Filtering phase 1-30. Other embodiments of the Validation phase 1-40 may omit this Are enough areas of interest left 40-600 process altogether if, for instance, the hardware or software supporting an embodiment of the inventive method had sufficient processing power to individually evaluate all detected areas without thresholding or with a reduced level of thresholding.

In this embodiment of the Are enough areas of interest left process 40-600, if the outcome of the decisional logic is Generate updated threshold value 40-500, an embodiment of the Generate updated threshold value process 40-500 is executed. An embodiment of the Generate updated threshold value process 40-500 is accomplished using the following pseudo-code:

```
while num of areas = 0 & factor > 0
    if factor > 1
        factor = factor − .5;
    elseif factor > .25
        factor = factor − .25;
    end
    thresh_val = img_stat + factor*std_val;
    blob_img = temp2 > thresh_val;
    [temp, num of areas] = bwlabel (blob_img,8);
end
if multiple targets present
    while num of areas = 1 & factor >= 1
        factor =              factor − .5;
        thresh val =          img_stat + factor*std_val;
        blob_img =            temp2 > thresh_val;
        [temp, num of areas] = bwlabel (blob_img,8);
    end
end
blob_img = temp2. *blob_img;
``` temp2 is the copied image talked about above
blob_img is the binarized thresholded image
bwlabwl is MATLABS (software program) component labeling routine In this embodiment of Generate an updated threshold value 40-600, the threshold factor is decremented each time an updated threshold value is generated. This prevents the algorithm from endlessly looping to identify areas of interest in a scene where no areas of interest may be present and instead requires it to eventually pass on only those areas with intensity some amount above the median or mean intensity of the pixels in the remaining areas of interest. This prevents the system from spending too much time analyzing any one image and dropping frames as a result.

Other embodiments of Generate and apply threshold values to image process 40-200 may be interested in pixel intensities below mean or median values, or with high measures of central tendency. Still other embodiments may have absolute thresholds for intensity, or purely directional threshold values. Other embodiments of the Validation phase 1-40 of the inventive method may avoid thresholding altogether.

The pixels that pass through an embodiment of the Apply threshold parameters to remaining areas of interest process 40-100 in this embodiment of the Validation phase 1-40 now move to a centroid and size calculation process 40-800. In an embodiment of the centroid and size calculation process 40-800, the centroid and size of each remaining area of interest is computed by a center of mass calculation where the pixel intensities are added up and the centroid is found to be at the center of mass of the blob. This location does not have to be in the center of the blob nor at the location where the pixel with the greatest intensity is. It is usually a location where there is a concentration of high intensity pixels and more often than not that is at the center of the area of interest. The size of the area of interest is just the maximum horizontal and vertical extents of the area of interest in pixels.

In this embodiment of the Determine if detected areas are valid phase 1-40, an embodiment of the centroid and size calculation process 40-800 is followed by an embodiment of a final size threshold process 40-900 where areas of interest that do not come within a certain percentage of expected size values (as defined in the detection parameters) are discarded. An embodiment of a final size threshold process 40-900 is accomplished by comparing the expected size value with the horizontal and vertical extents of the area of interest. It the expected size values don't match within some predefined measures (greater than or less than a certain magnitude, ratio, or percentage of total image size, for example) then that area of interest is not added to the detection list. Any areas of interest remaining after this final size threshold process 40-900 are the detection list 1-50 that comprise the output of this embodiment of the inventive method.

Other embodiments of the inventive method may omit or alter the size constraints, or may discard areas of interest that have a centroid skewed too far to one side or another. The output of other embodiments of the inventive method may be an array or an image or a coordinate set depending on the purpose and application of the embodiment.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method for identifying targets by detecting and analyzing hotspots in 2-dimensional infrared (IR) images through the combined use of Sobel magnitude and Sobel direction images comprising:
    receiving as input an infra-red (IR) intensity image, a thresholded Sobel magnitude image, a thresholded Sobel direction image, and target size parameters;
    detecting potential targets by morphologically processing said Sobel magnitude image and combining it with said intensity image to create a masked image including detected hotspots;
    filtering out incorrectly detected hotspots by checking each hotspot for a minimum number of distinct directions in said Sobel direction image and removing potential distortions from horizon or littoral lines; and
    determining if the filtered hotspots are valid targets by evaluating the filtered hotspots against at least one of intensity, size, or width thresholds contained in said target size parameters, and discarding as non-targets the filtered hotspots that are not within a certain percentage of said thresholds.

2. A method for detecting areas of interest in an image by combining edge magnitude and direction information comprising:
    receiving input image data and detection parameters;
    detecting potential areas of interest using edge magnitude by
    morphologically processing said magnitude image to fill gaps and eliminate noise from the image data;
    combining said morphologically processed image and original intensity image into a masked image; and
    identifying and counting said areas of interest in said masked image;
    filtering out incorrectly identified areas of interest using edge direction and edge magnitude; and
    determining if said areas of interest meet said detection parameters.

3. The method of claim 2, receiving input image data comprising detecting magnitude and direction of edges in said image to generate a thresholded magnitude image and a thresholded direction image with a threshold value contained in said detection parameters.

4. The method of claim 2, said detection parameters comprising target size information.

5. The method of claim 2, said input image data comprising an IR intensity image.

6. The method of claim 2, said morphologically processing said magnitude image to fill gaps and eliminate noise from image data comprising:
    binarizing said magnitude image to create a binarized image; and
    using a neighborhood of zeros and ones to dilate and erode said binarized image a predetermined number of times.

7. The method of claim 6, said predetermined number of dilation and erosion operations being determined by number of targets known to be present based on said detection parameters.

8. The method of claim 6, said morphologically processing said magnitude image to fill gaps and eliminate noise from image data further comprising removing singleton pixels from said binarized image after said predetermined number of dilation and erosion operations.

9. The method of claim 2, said combining said morphologically processed image and original intensity image into a masked image comprising multiplying said morphologically processed and original intensity images together.

10. The method of claim 2, said identifying and counting said areas of interest in said masked image comprising morphological image analysis on said masked image to identify contiguous groups of pixels in said masked image.

11. The method of claim 2, said determining if said areas of interest meet said detection parameters comprising:
    applying threshold parameters to remaining detected areas of interest;
    calculating centroid, size, and width of said remaining detected areas of interest; and
    discarding said remaining detected areas of interest which do not meet size a threshold.

12. The method of claim 11, said discarding said remaining detected areas of interest which do not meet size thresholds comprising comparing said calculated centroid, size, and width of said remaining detected area of interest against a predefined size value and discarding said remaining detected area of interest if said remaining detected area of interest is not within a certain percentage of an acceptable size value.

13. A method for detecting areas of interest in an image by combining edge magnitude and direction information comprising:
    receiving input image data and detection parameters;
    detecting potential areas of interest using edge magnitude;
    filtering out incorrectly identified areas of interest using edge direction and edge magnitude by
    evaluating a detected area of interest with a directional constraints filter;
    removing background elements from said detected area of interest;
    enhancing said detected area of interest with a weighting factor; and
    performing a convolution on said detected area of interest with a predefined kernel; and
    determining if said areas of interest meet said detection parameters.

14. The method of claim 13, said directional constraints filter comprising:
    extracting pixels of said detected area of interest from said direction image;
    counting how many separate, distinct directions said pixels in said detected area of interest have in said direction image;
    comparing said count of separate, distinct directions to a minimum threshold value; and removing from further consideration as an area of interest any said detected area are of interest with a count of said separate, distinct directions less than said minimum threshold value.

15. The method of claim 13, said removing background elements from said detected area of interest comprising removing pixels with horizontal gradient direction from said detected area of interest if said detected area of interest occupies more than a predetermined percentage of the horizontal field of view of said input image data and more than a certain percentage of pixels in said detected area of interest have horizontal gradient direction.

16. The method of claim 15, said removing background elements from said detected area of interest further comprising dilating remaining pixels in said detected area of interest a predetermined number of times after said removal of pixels with horizontal gradient direction from said detected area of interest.

17. The method of claim 13, said removing background elements from said detected area of interest comprising removing pixels with a specific horizontal gradient direction from said detected area of interest if said detected area of interest touches a vertical edge of said image input data and said detected area of interest occupies a certain percentage of the horizontal field of view of said image and a predetermined number of leftmost pixels of said detected area of interest have a specific horizontal gradient direction.

18. The method of claim 17, said removing background elements from said detected area of interest further comprising dilating remaining pixels in said detected area of interest a predetermined number of times after said removal of pixels with said specific horizontal gradient direction from said detected area of interest.

19. The method of claim 13, said enhancing said detected area of interest with a weighting factor comprising:
  binarizing said detected area of interest;
  calculating said weighting factor from mean value of pixels analogous to said pixels in said detected area of interest in said magnitude image; and
  multiplying said analogous pixels from said masked image with said binarized detected area of interest and with said weighting factor.

20. The method of claim 13, said determining if said areas of interest meet said detection parameters comprising:
  applying threshold parameters to remaining detected areas of interest;
  calculating centroid, size, and width of said remaining detected areas of interest; and
  discarding said remaining detected areas of interest which do not meet size a threshold.

21. A method for detecting areas of interest in an image by combining edge magnitude and direction information comprising:
  receiving input image data and detection parameters;
  detecting potential areas of interest using edge magnitude;
  filtering out incorrectly identified areas of interest using edge direction and edge magnitude; and
  determining if said areas of interest meet said detection parameters by
  applying threshold parameters to remaining detected areas of interest;
  calculating centroid, size, and width of said remaining detected areas of interest; and
  discarding said remaining detected areas of interest which do not meet size a threshold;
  where said applying threshold parameters to remaining detected areas of interest includes
  identifying and counting said remaining detected areas of interest using morphological image analysis to identify contiguous groups of pixels; and
  generating and applying a threshold value to said remaining detected areas of interest if:
  more than one said detected area of interest remains,
  horizontal pixels were removed from said remaining detected area of interest,
  said removing background elements from said detected area of interest process indicated the presence of removable background elements in said image data, or
  said detection parameters indicate the presence of known areas of interest separated in said image data by less than the size of one of said known areas of interest.

22. The method of claim 21, said generating and applying a threshold value to said remaining detected areas of interest comprising:
  generating a threshold value;
  applying said threshold value; and
  iterating said steps of threshold value generation and application as determined by a threshold factor.

23. The method of claim 22, said generating a threshold value comprising:
  calculating image statistics based on said remaining detected areas of interest;
  setting said threshold factor value based on said calculated image statistics and said detection parameters; and
  calculating a threshold value based on said calculated image statistics and said threshold factor value.

24. The method of claim 22, said applying said threshold value comprising:
  removing pixels from said remaining detected areas of interest if said pixels have a value less than said threshold value;
  comparing number of said remaining detected areas of interest after pixel removal against a predefined number of areas of interest and checking is said threshold factor value exceeds a defined minimum value if said number of areas of interest remaining does not meet or exceed said predefined number of areas after pixel removal
  iterating said steps of threshold value generation if said threshold value exceeds said defined minimum value and said number of said remaining detected areas of interest after pixel removal is less than said predefined number of areas of interest.

25. A non-transitory computer readable medium having stored thereon a computer executable program for detecting areas of interest in an image, comprising:
  receiving input image data and detection parameters;
  detecting magnitude and direction of edges in said image to generate a magnitude image and a direction image;
  detecting potential areas of interest using edge magnitude by
  morphologically processing said magnitude image to fill gaps and eliminate noise from the image data;
  combining said morphologically processed image and original intensity image into a masked image; and
  identifying and counting said areas of interest in said masked image;
  filtering out incorrectly identified areas of interest using edge direction and edge magnitude; and
  determining if said areas of interest meet said detection parameters.

* * * * *